United States Patent [19]

Davis et al.

[11] 4,363,093

[45] Dec. 7, 1982

[54] PROCESSOR INTERCOMMUNICATION SYSTEM

[75] Inventors: Michael I. Davis, Kingsworthy, near Winchester, England; Daniel T. W. Sze, Boca Raton, Fla.

[73] Assignee: International Business Machines Corporation, Armonk, N.Y.

[21] Appl. No.: 129,053

[22] Filed: Mar. 10, 1980

[51] Int. Cl.³ .............................................. G06F 15/16
[52] U.S. Cl. .................................................... 364/200
[58] Field of Search ... 364/200 MS File, 900 MS File; 370/86

[56] References Cited

U.S. PATENT DOCUMENTS

| | | | |
|---|---|---|---|
| 3,668,649 | 6/1972 | Pedersen et al. | 364/200 |
| 3,714,635 | 1/1973 | Hamilton et al. | 364/200 |
| 3,806,885 | 4/1974 | Moore | 364/200 |
| 3,821,713 | 6/1974 | Broadhurst et al. | 364/200 |
| 4,007,450 | 2/1977 | Haibt et al. | 364/200 |
| 4,016,548 | 4/1977 | Law et al. | 364/200 |
| 4,019,176 | 4/1977 | Cour et al. | 364/200 |

*Primary Examiner*—Raulfe B. Zache
*Assistant Examiner*—David Y. Eng
*Attorney, Agent, or Firm*—D. Kendall Cooper; John C. Black; J. Jancin, Jr.

[57] ABSTRACT

A processor intercommunication system includes a plurality of stations which are interconnected by a transmission link, each station having an associated processor. Further, each station comprises means which provide a data link protocol mechanism for establishing and maintaining a multiplicity of logical connections or transfer sessions between the station and several other stations. Thus application programs of all kinds in the processors can communicate with programs or data files in remote processors and need not be involved in communication operations which are handled by the stations. Link access circuitry is provided also in each station for absorbing the physical and topological characteristics of the transmission link so that the data protocol circuitry establishing and maintaining logical connections is independent of these characteristics.

7 Claims, 13 Drawing Figures

FRAME FORMAT

DATA ENCODING

ARBITRARY BYTE

SYNC CHARACTER

WITH AVAILABLE INDICATION:

WITH UNAVAILABLE INDICATION:

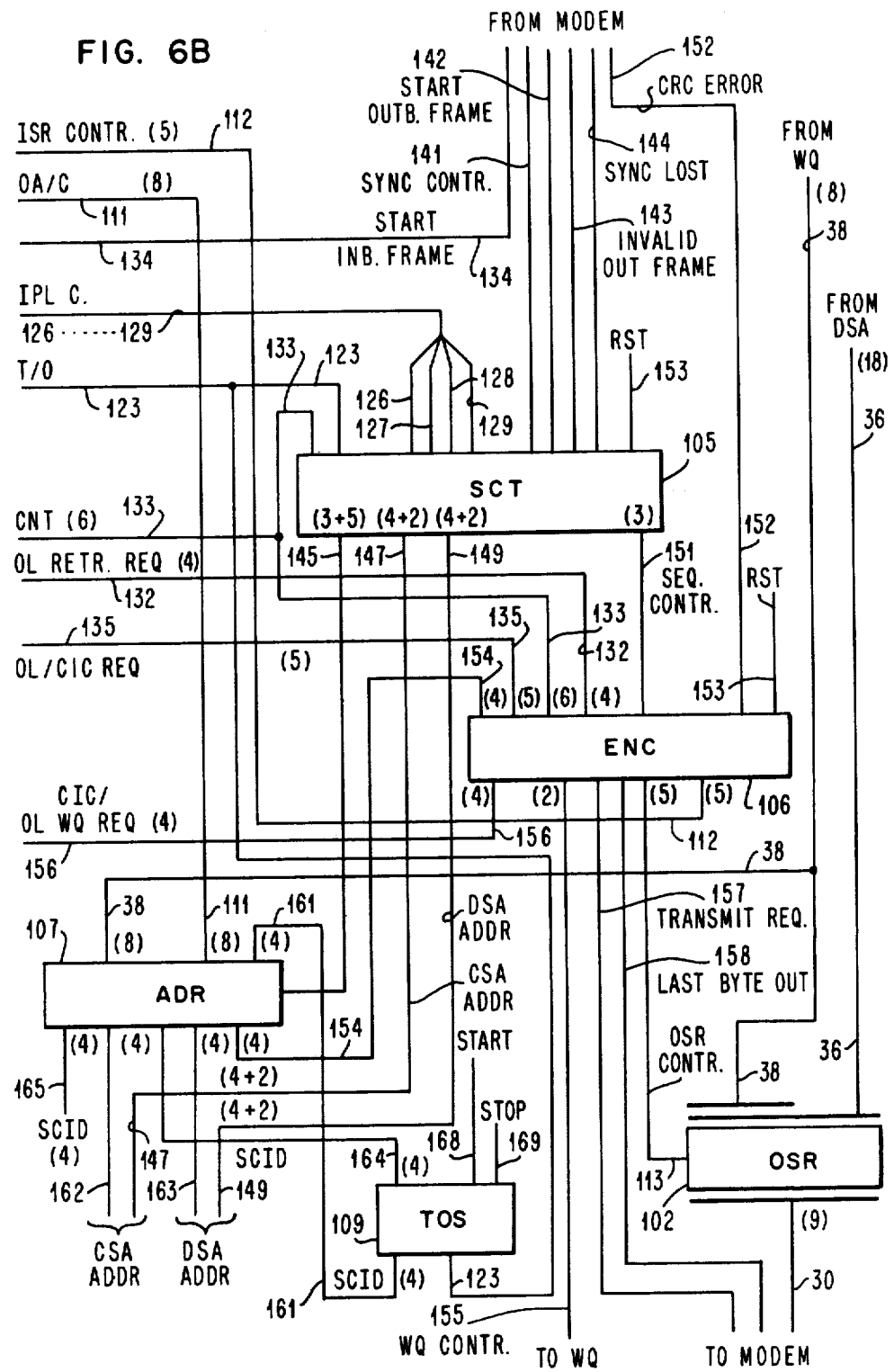

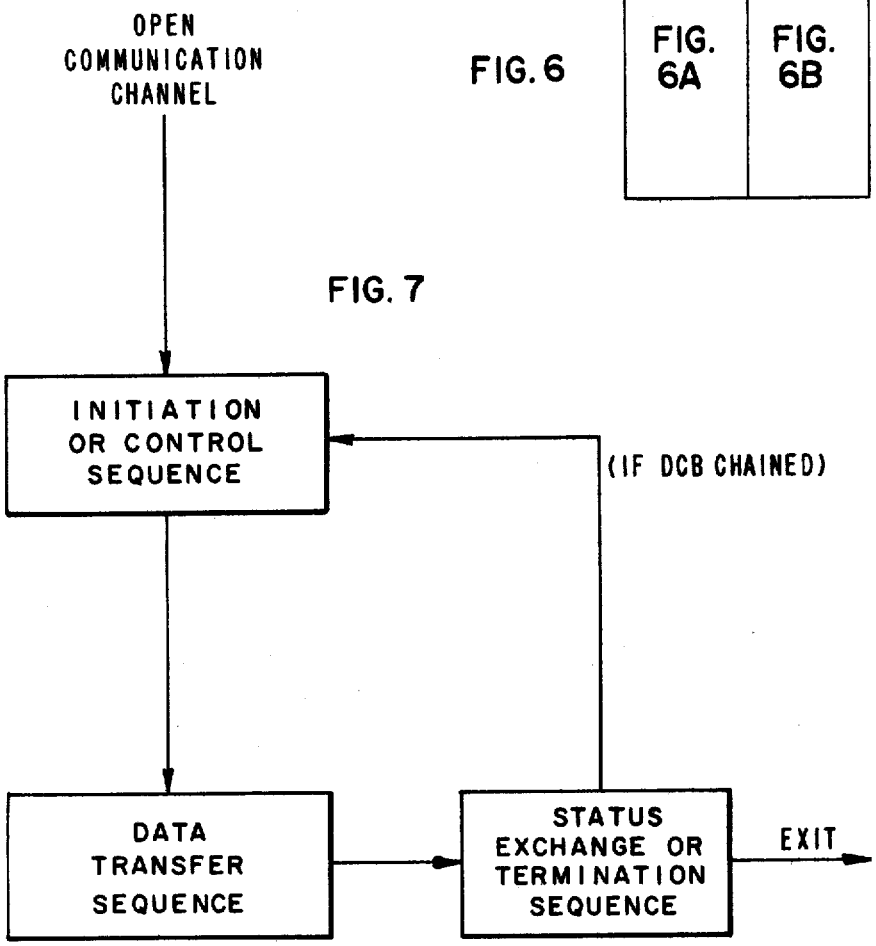

WRITE SESSION

READ SESSION

PROCESSOR INTERCOMMUNICATION SYSTEM

TECHNICAL FIELD

This invention relates to a communication system for a plurality of processors which are located remote from each other and which are attached to a plurality of interconnected stations, and it relates more particularly to means and a method allowing multiple separate peer-to-peer transfer operations between the units in such a system.

RELATED PATENT APPLICATIONS

The following patent applications cover subjects related to the present processor intercommunication system, were filed the same day as the present patent application, and are specifically incorporated by reference herein.

U.S. Patent Application Ser. No. 129,052 entitled: "Loop Initialization Mechanism for a Peer-to-Peer Communication System".

U.S. Patent application Ser. No. 129,004 entitled: "Remote Processor Initialization in a Multi-Station Peer-to-Peer Intercommunication System".

BACKGROUND ART

For interconnecting a plurality of processors, several principles can be used. A system can either include a central unit exercising control over all communication transactions in the network, or it can comprise several units of equal ranking, i.e. a peer-type system with mutual or distributed control. Further, the processors can participate in handling of the data transmission tasks, but there can also be systems providing separate communication handling units. According to another aspect, one can distinguish between systems allowing only a single communication connection to be in existence, and other systems which enable a number of simultaneous connections.

U.S. Pat. No. 3,761,879 (Brandsma et al.) discloses a switching unit for selectively interconnecting plural processor modules with plural storage modules. No central control is provided, and several connections can exist simultaneously. However, neither transmission of data between remote locations, nor a peer-to-peer exchange between processors are involved.

In U.S. Pat. No. 3,806,885 (Moore) an arrangement is described for interconnecting multiple computing subsystems without central control. But only one subsystem is the master at any time, and mastership is passed from processor to processor by a polling mechanism.

A loop arrangement for data transfers between several subsystems is disclosed in U.S. Pat. No. 3,821,713 (Broadhurst et al.). This arrangement allows simultaneous transfers between selected pairs of subsystems. It requires, however, a separate loop for each of the interconnected subsystems, and it is a receiver-driven system, i.e. no possibility is provided to initiate a transfer operation from a sending unit.

U.S. Pat. No. 4,007,450 (Haibt et al.) describes a multicomputer system including a loop interconnecting a plurality of computer nodes. This system allows updating of identical data sets which are stored in different nodes, without requiring a central control unit. In each data set updating operation, one node is the master node, while the other nodes storing the same data set that must be updated are slave nodes. A mutual frame exchange establishes an updating operation. The system is limited, however, to a particular application, i.e. data set management. Furthermore, the data link control for the communication medium is integrated with the application, i.e. data set management. Hence, the application must be intimately aware of whether the process it communicates with is remote or local, because the two cases require different handling.

Cour et al. disclose in U.S. Pat. No. 4,019,176 a communication system for a plurality of stations. The stations use a single common channel in the form of a loop, and no central control is provided. There is, however, no pairwise cooperation for multiple simultaneous connections. Rather, only one station transmits at a time, and the right to transmit is passed from one station to the next according to a predetermined list.

U.S. Pat. No. 4,058,681 (Imaizumi) describes a transmission network comprising plural stations which are connected in parallel relationship to a bus. Each station has communication control means and a processor, and no central control is provided. Also in this system, only one station has control over the bus at any time, and this control function is transferred from station to station.

U.S. Pat. Nos. 3,714,635 (Hamilton et al.) and 3,842,405 (Key et al.) disclose Input/Output arrangements for a computer, comprising adapter units that are programmable or microprogrammable for adaptation to different line characteristics or I/O unit characteristics. This approach eliminates the need for different adapters for each of the different types of modems or lines or I/O devices. The adapters in these arrangements thus present a given interface to the computer or its communications control unit regardless of attached devices or lines. These patents do not disclose, however, adapter or interface units for peer-to-peer type intercommunication systems.

It is an object of the present invention to provide a processor intercommunication system including a plurality of communication stations which can cooperate in a peer-type fashion.

It is a further object to provide such intercommunication system enabling multiple simultaneous sessions between pairs of stations or processors, in which each station can take the initiative to become temporarily a master for one of such sessions.

Another object of the invention is to provide a multistation processor intercommunication system allowing peer-to-peer sessions for all types of applications in the processors, and in which each application program in a processor is free of communication requirements and restrictions, and need not be aware whether the process it communicates with is in a locally attached I/O device or in a remote processor attached to another station.

A further object of the invention is a multiple processor intercommunication system in which the data link control is separated from the application programs, but also from the link access mechanism.

Another object is the provision of an effective communication system between a plurality of processors that are not very large and complex, by providing circuit means for certain link control functions to avoid programming efforts for these functions in the processors.

One other object is a multiple-station processor intercommunication system in which each session between stations is concluded by complete and correct updating of status information.

These and other objects and advantages of the invention will be evident from the following description of a preferred embodiment of the invention in connection with the drawings.

BRIEF DESCRIPTION OF THE DRAWINGS

FIGS. 6A and 6B (Join as shown in FIG. 6) Block diagram of the link manager in a station;

FIG. 7 Schematic illustration of the three different states of each particular session, i.e. control, data transfer, and termination;

ACRONYMS AND ABBREVIATIONS

Figure 1:
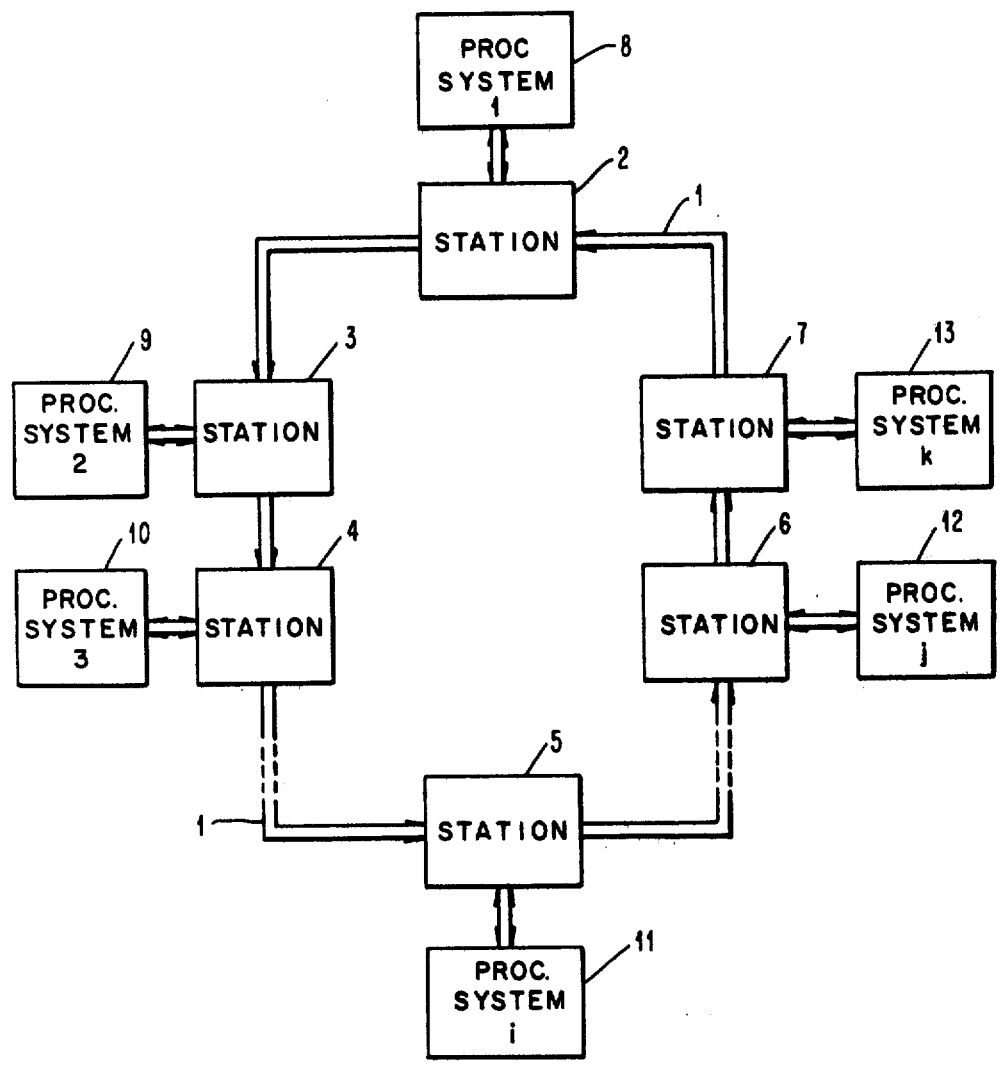
FIG. 1 Configuration of a loop communication system interconnecting a plurality of processors.

The following acronyms and abbreviations are used herein:
A—Frame Available
ADR—Address Register and Funnel
AFD—Addressing and Frame Disposition Circuitry
AV—Availability
B—Broadcast Frame
BFR—Buffer 0/1 Indicator
C—Control Field (Byte)
CC—Condition Code
CF—Control Frame
CHN—Chain
CIC—Channel Interface Controller
CNTL—Information Field Length Indicator
CR—Station Receive Sequence Count
CRC—Cyclic Redundancy Check
CS—Station Send Sequence Count
CSA—Control Storage Array
CV—Code Violation
DA—Destination Address
DCB—Device Control Block
DCB-ID—Device Control Block-Identifier
DEC—Decoder and Status Monitor
DFF—Data Full Frame
DPC—Direct Program Control
DPF—Data Partial Frame
DSA—Data Storage Array
DT—Data Transfer Function Bits
EIPL—External Initial Program Load (Also Termed Remote IPL)
ENC—Work Queue Response and Encoder Unit
FIFO—First In First Out
FUN—Funnelling and Latching Unit
HLD—Hold
HR—Hold Register
HRA—Hold Register Array
I—Subchannel Interrupt Mask
ID—Identifier
IDF—Initialization Data Frame
IF—Input Flag
IIB—Interrupt Information Byte
INFO—Information
INT—Inbound/Outbound Interface Circuitry
I/O—Input/Output
IOCB—I/O Command Block
IPL—Initial Program Load
ISR—Input Staging Register
ITF—Initialization Termination Frame
KEY—Cycle Steal Address Key
LM—Link Manager
LTC—Link Transfer Count
M—Match
M1, M2—Modem 1, Modem 2, etc. etc.
MOD21—Module 21
MTC—Message Transfer Command
NIM—Non-Intelligent Mode
NOM—Normal Operating Mode
NS—Non-Sequenced Function Bits
NSI—Non-Sequenced Information Frame
NSR—Non-Sequenced Response Frame
OA—Origin Address
OL—Outbound Link
OSR—Output Staging Register
P1, P2—Processor 1, Processor 2, etc. etc.
PCI—Program Controlled Interrupt
PDA—Destination Address Parity
POA—Origin Address Parity
R—Regulatory Function Bits
RA—Data Retry Address
RCC—Receiver Clock and Control Circuitry
RD—Read
RE—Reserve Bit
R/F—Response Required Final Bit
REJ—Reject Output (or Input) Remote
IPL—Same As External Initial Program Load (EIPL)
RES—Response
RIF—Request Initialization Frame
RSB—Residual Status Block
S—Sync Byte Indicator
S1, S2—Station S1, Station S2, etc. etc.
SC1, SC2,—Subchannel 1, SC2,—Subchannel 2, etc. etc.
SCID—Subchannel Identification
SCT—Sequence Controller
SE—Suppress Exception
SF—Status Frame
SIF—Set Initialization Frame
SLS—Station Link Status
SSF—Station State Field
STO—Time-out Control Bit
SYNC—Synchronization
TED—Transmitting Encoder and Driver Circuitry
TOR—Time-out Retry
TOS—Time-out Stack
UPD—Updating Unit
VLD—Variable Length Delay Storage
WD—Word
WQ—Work Queue
WQS—Work Queue Storage
WR—Write
X—Reserve (Not Used)

DESCRIPTION OF A PREFERRED EMBODIMENT

The specification disclosing a preferred embodiment of the invention is partitioned into ten sections:

1. General facts of the system.—2. Principles and control of frame transmission.—3. Frame types and formats.—4. The station.—5. The modem.—6. The storage section.—7. The link manager.—8. Interaction between processor and station.—9. The channel interface controller.—10. Sessions between pairs of stations.

1. GENERAL FACTS OF THE SYSTEM

1.1 Definitions

The communication system to be described has a demand-response structure which provides transparency and code independence. Information is transmitted in fixed length units called frames. The physical mechanism that transmits and receives information is called a station. The communication line which carries information from one station to the next is called a link. Frames initiated by a given station to be transferred to another station are called demand frames. On receiving a demand frame or frames, the station must acknowledge the receipt with either a frame called response frame, or another demand frame. Each frame transmitted contains checking information which is used for error detection and subsequent recovery when required. The demand-response approach provides flexibility necessary for conveying procedures to control the transmission of information over different physical communications facilities. On top of the demand-response structure, a structure of command, data, and status is further mapped to provide a protocol between processors. Basic terms used in understanding the remainder of this specification are briefly defined below. More terms will be defined as the document progresses.

Station: A message source and a sync point in the data transmission system.

Link: The data transmission channel having a plurality of station nodes that interconnects two or more stations.

Loop or Ring: A link carrying a one way transmission that begins at a given station, traverses through one or more stations, and returns to the given station.

Frame: The basic unit of information transfer from one station to another.

Demand Frame: The information frame initiated by a given station to be transmitted to another station.

Response Frame: The receipt of a demand frame or frames by a station must be countered with an acknowledgement. The acknowledgement frame is the response frame.

Host Processing System: Host Processing system is that unit which is connected to the other side of a station, usually via the Channel I/O interface of the processing system.

Local Station: The local station to a given host processing system is that unit which is directly attached to the Channel I/O interface of the host processing system. The host processing system physically communicates to all other stations via its local station.

Subchannel: The subchannel is the physical subdivision of a local station which logically forms part of a station elsewhere on the link. It contains the control words and buffering necessary to effect data transfers between the two stations. Each local station contains a subchannel for each station attached to the link.

Device Control Block/DCB: A block of control information residing in a station and containing the current parameters for the operation just executed.

External Initial Program Load/EIPL: A procedure by which the initial program load (IPL) for one station can be effected from another station upon request. Also termed: Remote(IPL).

1.2 Purpose and Basic Structure of the System

FIG. 1 shows the basic structure of a processor intercommunication system in which the invention finds application. A serial loop 1 interconnects a plurality of stations 2, 3 . . . 7. To each station, a host processing system 8, 9 . . . 13 is attached. The processing systems may be of different sizes and structures, and they may be general purpose systems or adapted for a specific application. There is no central station or controller in the system.

Signals on the loop propagate in one direction, as indicated by the arrows, either bit-serial or byte-serial, depending on the requirements of the particular system and the physical link chosen. The specific embodiment described in this specification provides bit serial transmission.

The main purpose of this processor intercommunication system is to provide a single mechanism for high-speed storage to storage data transfer between two or more processing systems or subsystems. It also allows incremental adding of processing power into an overall processing system, thus achieving a fully distributed multi-processing system. It is mainly intended for in-house local interconnections.

1.3 Frame Format

Figure 2:
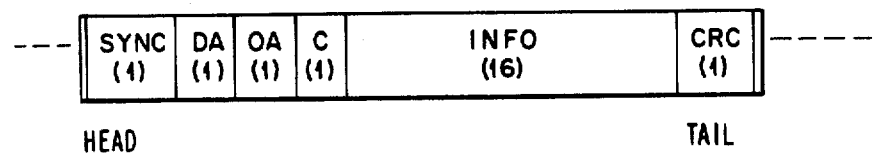
FIG. 2 Frame format of data travelling on the loop.

Data are transferred on the loop in the form of consecutive frames. The format of such a frame is shown in FIG. 2. Each frame comprises twenty-one eight-bit bytes or characters. They contain the following information:

SYNC (1 byte): The sync field identifies the beginning of a frame. Since frames are continuous, the synchronization sync field indirectly identifies the termination of a previous frame. The sync field also indicates accessibility of the frame, i.e. it contains an available/unavailable indication. Details of the sync field are explained in a later section.

Destination Address DA (1 byte): An eight-bit destination address identifying the intended receiving station of the respective frame.

Origin Address OA (1 byte): An eight-bit origin address identifying the originating or sending station of the respective frame.

Control C (1 byte): An eight-bit field used by the sender of the respective frame to convey its internal state information, or identifying the content category of the information field, e.g., whether the information field contains status, response, instructions, or data. It also contains information pertaining to the extent in which the information field is filled. More details about the control field functions will be given in a later section.

Information Field INFO (16 bytes): The information field comprises 16 bytes containing either data, status information, or control information. In some frames, this field may be empty or partially filled depending on the specification of the control field.

Cyclic Redundancy Check CRC (1 byte): A check character generated from the contents of the four fields DA, OA, C, and INFO.

The sync character SYNC and the check character CRC are physical frame parameters. The other four fields, i.e. DA, OA, C, and INFO, contain logical frame parameters. The physical frame parameters are those parameters that are technology dependent and are used to validate and extract the logical frame parameters. They vary with the specific system implementation chosen. Only one embodiment example will be described in this specification, though many others are possible.

2. PRINCIPLES AND CONTROL OF FRAME TRANSMISSION

2.1 Addressing Convention

Recognition of a valid destination address and a valid origin address is required by the receiving station prior to the acceptance of a frame.

A station must accept at least two different destination addresses. One of the addresses is a broadcast address. The broadcast address may not be used in the Origin Address field. The other address is the address or addresses assigned a given station which must uniquely identify that station on the link. The address uniquely identifying the station on the link is said to be the station address. The station having either data or responses to transmit under normal operation mode must use the appropriate station address.

2.2 Station Modes

Normal Operating Mode NOM

Normal Operating Mode NOM is the station operational mode for information interchange. Being in NOM mode implies that this station is "up and running", i.e., the processing system is connected and may intelligently send or receive messages.

Non-Intelligent Mode NIM

Non-intelligent Mode NIM is the mode where the station has a machine malfunction and hence has to be reinitialized, or the station and the attached processing system has just been powered up, or the processing system has yet to be initialized. All frames, except for a Set Initialization Frame SIF (cf. Section 3.4) received while the station is in NIM mode will be ignored. The response for these frames received will be a broadcast Request Initialization Frame RIF (cf. Section 3.4). The station exits NIM mode to NOM mode on receiving any command from the I/O interface. The station's modem, however, will evaluate all frames for achieving and maintaining synchronization (even in NIM mode).

2.3 Transmit/Receive Procedure

There has to be an orderly procedure to determine when each station in the loop can output messages onto the loop: otherwise, the transmission would be garbled. The procedure goes as follows:

- The station transmits the information provided by the attached processing system only if the station has declared to be in synchronization.
- The station transmits only on frames that either are marked as available, or have their destination address/origin address equal to the station address. Frames transmitted by this station must be marked as unavailable if the station has inserted information.
- Frames arriving at the station having their destination address or origin address equal to the station address will be re-marked as available if the station has no information to transfer.
- The station always listens to information arriving on the link. Information is peeled off only when the destination address equals the station address.

A demand frame or frames transmitted must be responded to with either another demand frame or a response frame.

2.4 Invalid Frame

An invalid frame is one that is received in one of the following conditions: (a) It is received during un-synchronized state, (b) when the check character declares the frame just received to be invalid, or (c) when the frame is perceived to contain code or modulation violations in areas other than sync character location. All invalid frames received will be discarded with no further examination.

2.5 Frame Synchronization

A station is considered synchronized when the station can correctly predict the arrival of the synchronization character and the check character. Furthermore, the check character must be able to declare the frame to be free of error.

The procedure for synchronization is as follows:
(a) A sync counter which counts modulo 4 (from zero to 3) is initialized to zero.
(b) The sync character detection circuitry continuously scans the input bit stream of the sync code. If the sync counter value is less than 3, each sync character detected causes the CRC to be compared for a valid frame. A valid frame detected causes the sync counter to be incremented by 1. An invalid frame detected causes the sync counter to be decremented by 1. This process continues until the sync counter equals 3 or 0.
(c) When the sync counter equals 3, the station is to be in frame sync. Frame sync is maintained if valid sync characters are received at proper time intervals.
(d) When the sync counter equals 0, the station is said to be out of frame sync.

More details on the frame synchronization procedure are given in section 6.

2.6 Sync Field/Signal Format

The eight bits of a sync field have the following functions:

| Bit No.: | 0 | 1 | 2 | 3 | 4 | 5 | 6 | 7 |
|---|---|---|---|---|---|---|---|---|
| Function: | AV | CV | CV | CV | CV | AV | PDA | POA | where

Figure 3A:
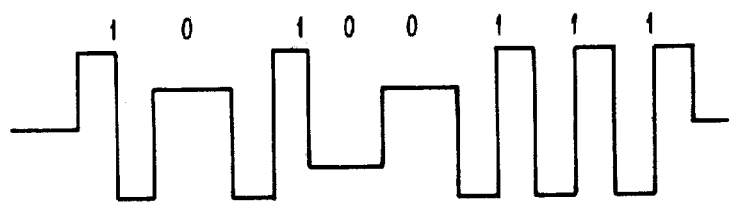
FIGS. 3A, 3B, 3C Signal waveforms of an arbitrary byte and of sync characters travelling on the loop.
Figure 3B:
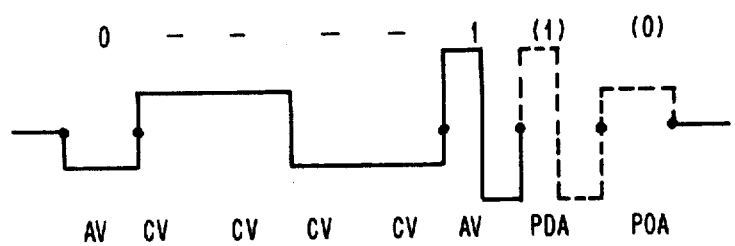
Figure 3C:
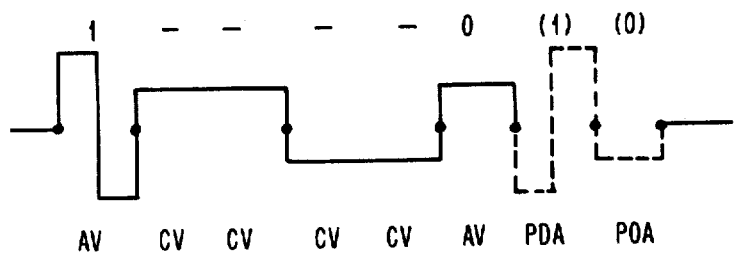

AV = availability bit (pair 01 = available, pair 10 = unavailable)
CV = code violation bit
PDA = destination address parity
POA = origin address parity As shown, the actual sync information occupies bits 1-4 of the sync character, while the frame availability information is provided in bits 0, and 5. Bits 6 and 7 are parity check bits for the two address fields Destination Address DA and Origin Address OA. If a bifrequency signal format is used as shown in FIG. 3A, the appearance of sync characters with either available or unavailable indication is as shown in FIGS. 3B and 3C. The unique violation of the bifrequency format in bit positions 1 . . . 4 is easily recognizable.

3. FRAME TYPES AND FORMATS

3.1 Control Field Functions

The control field specifies one of three demand or response frame types: Data Transfer, Regulatory, and Non-Sequenced. The formats of the control field for these three frame types are as follows:

| Bit Assignment | C0 | C1  | C2 | C3  | C4 | C5 | C6 | C7 |
|----------------|----|-----|----|-----|----|----|----|----|
| Data Transfer  | 0  | I/O | DT | DT  | CS | CS | CR | CR |
| Regulatory     | 1  | 0   | R  | R   | CS | CS | CR | CR |
| Non-Sequenced  | 1  | 1   | RE | R/F | NS | NS | NS | NS |

The various bits have following functions:

CS = Station send sequence count:

This is a two bit counter that is used to number all frames transferred under the normal operating mode. This numbering allows for transmission of up to 3 contiguous frames prior to receiving responses for these frames. It is also a means for error detection and recovery.

CR = Station receive sequence count:

This is a two bit counter used in conjunction with the CS count for error detection and recovery. The numbering is used only under normal operating mode.

I/O = Input/Output bit:

This bit is used to associate the frame transmitted with the operation currently residing in the station. A logical zero indicates input, while a logical one indicates output.

DT = Data transfer function bits:

These bits are used to define four types of data transfer frames.

RE = Reserve bit.

R = Regulatory function bits:

These bits are used to define four types of regulatory frames. These regulatory frames are used to regulate data transfer across stations.

NS = Non-sequenced function bits:

These bits are used to define frames operating under initialization state, abnormal condition states, etc.

R/F = Response required final bit:

The R/F bit is used in non-sequenced formatted frames to solicit responses. Since non-sequenced frames, except those that are intended for initialization, are passed directly to the system programs above, it therefore is the function of the system above the station to provide proper response to frames containing the final bit.

3.2 Data Transfer Format

The data transfer frames are primarily the frames used to carry messages from one processing unit to another. They are also used to carry the control and the status messages concerning the transmit and the receive stations. All data transfer frames are considered to be demand frames.

The data transfer format may be used only under the normal operating mode. There are four data transfer frame formats possible. These include:

| Data Transfer Frames   | C2 | C3 |
|------------------------|----|----|
| Data full frame = DFF  | 0  | 0  |
| Data partial frame = DPF | 0 | 1  |
| Control frame = CF     | 1  | 0  |
| Status frame = SF      | 1  | 1  |

Data Full Frame DFF format indicates that the information field is filled with 16 bytes of data. Message transfer always begins with DFF frames unless the message is less than 16 bytes. The I/O bit must be equal to a logical one for the DFFs.

Data Partial Frame DPF format indicates that the information field has less than 16 bytes of data. The first two bytes of the information field contains a byte count indicating the total number of data bytes in the information field. The data may be less than 16 data bytes but the frame must still be stuffed, with logical zeros if necessary, to make up a 16 byte field. The I/O bit must be equal to a logical "one" for the DPF sent.

The Control Frame CF format is intended for initiating a transfer between stations. Instead of containing data as in DFF and DPF, the information field contains 16 bytes of control information.

The I/O bit in this case should be a logical "zero" for "read op" and a logical "one" for "write op". Commands are transferred or re-transferred from the processor under the control frame.

The Status Frame SF format is used as a response concerning acceptance or non-acceptance of the demand made in a control frame. The SF format is also used for station status exchange in the termination of data transfer. In both cases, the status frame is used to provide station status information to the corresponding station engaged in a data exchange, or wishing to make a data exchange, i.e. proceed with exchange. The status information is contained in the first byte of the information field. The subsequent bytes contain logical zeros.

The I/O bit should be a logical "zero" if the status frame is initiated due to a "read op" resident in the sending station, and a logical "one" if the status frame is initiated due to a "write op" resident in the sending station. For cases where a status must be provided but no specific read or write op is active, the first byte (byte 0) of the information field INFO is a status frame is formatted as follows:

| Bits | 0 | 1 | 2 | 3 | 4 |                |
|------|---|---|---|---|---|----------------|
|      | 1 |   |   |   |   | Sequence Check |
|      |   | 1 |   |   |   | Data Check     |
|      |   |   | 1 |   |   | Byte Count LO  |
|      |   |   |   | 1 |   | Byte Count HI  |
|      |   |   |   |   | 1 | Hardware Error |

| Bits | 5 | 6 | 7 |                                              |
|------|---|---|---|----------------------------------------------|
|      | 0 | 0 | 0 | Normal                                       |
|      | 0 | 0 | 1 | Station Busy                                 |
|      | 0 | 1 | 0 | Operation Reject                             |
|      | 0 | 1 | 1 | Valid Frame, Station Subchannel Inactive     |
|      | 1 | 0 | 0 | Non-Sequenced Received, no active DCB        |
|      | 1 | 0 | 1 | Non-Sequenced Frame Terminate, with active DCB |
|      | 1 | 1 | 0 | Sequenced Read Request w/o DCB               |
|      | 1 | 1 | 1 | Sequenced Write Request w/o DCB              |

Sequence Check implies that a protocol sequence error had occured on the link and is not to be confused with sequence count errors which are data check errors.

Data Check implies that data did not arrive at the intended station correctly, hence no response was received for the data frame or frames sent within the time out limits. Data Check is brought up only after the passage of the control sequence for the command transfer.

Byte Count Lo implies that the data byte count specified in the DCB is less than that received.

Byte Count Hi refers to the condition where the data byte count specified in the DCB is more than that received in the data transfer.

Operation Reject refers to the condition where both stations attempting to provide an exchange are given an incompatible set of commands, e.g., Write command in station A, and Write command in Station B.

Hardware Error refers to a hardware error encountered in the local station while making an exchange.

Station Busy refers to the condition where the station has received a command frame from another station prior to the posting of the current DCB.

Non-Sequenced Frame Terminate refers to the condition where the station received a non-sequenced frame while in the midst of data frame transfer, hence terminating the data transfer DCB residing within the station.

Sequenced Read Request without a DCB refers to the state where an outstanding read request was received from a station on the loop and no DCB is presently active in the station to direct proper interaction required of the Read request.

Sequenced Write Request without a DCB: Like the status code point above this status decode refers to a write request instead.

Non-Sequenced Received No Active DCB: Like the status code point above, this refers to a non-sequenced frame instead.

Valid Frame, Subchannel Inactive implies that either an SIF was received by a station configured for station-to-station external initial program load EIPL or any valid frame except SIF was received while the station is in NOM mode with the subchannel inactive.

3.3 Regulatory Format

The regulatory format, as the name implies, is used to regulate information flow between stations involved in an exchange. The regulatory format hence is used in conjuction with the data transfer frames operating under the normal mode. The four types of regulatory frames are:

| Regulatory Frames | C2 | C3 |
|---|---|---|
| Reject Output = REJ | 1 | 1 |
| Reject Input = REJ | 1 | 0 |
| Hold = HLD | 0 | 1 |
| Response = RES | 0 | 0 |

A Reject REJ frame is used by the receiving station to return an error sequence indication prior to the "link up" between the two stations for data transfer. An example is the receiving of a data frame prior to the station being primed with a Device Control Block DCB. Reject Output is issued with respect to an output operation received while Reject Input is issued against an input operation received.

A Hold HLD is for the purpose of indicating a temporary backup condition within the station. The usual problem is the lack of buffer space or inability of the processing unit to respond to the data accumulated within the station. The station that has been given a Hold will wait for a response frame prior to continuing the data transfer.

A Response RES frame is used to denote that the station has received data and that the data frames previously received as indicated by the sequence count are in good condition.

The information field in a regulatory frame is ignored.

3.4 Non-Sequenced Format

The non-sequenced format is intended either for direct processor-to-processor communication with little or no intervention on the part of the station, or for system initialization. It will be used for processor-to-processor control transfer. There are no sequence counts associated with each frame transferred. If a response is required by the sender, the non-sequenced frame transmitted by the sender must have the Response Required Final bit turned on. The receiver, or the receiving processor must, in this case, provide a response. The non-sequenced format is intended for system use, not for the applications programmer.

The station in receiving a non-sequenced frame except for the Initialization Data Frame will transfer the Origin Address field, the Control field and the entire data field to the host attachment or processing system. The non-sequenced formats are:

| Non-Sequenced Frames | C4 | C5 | C6 | C7 |
|---|---|---|---|---|
| Initialization Data Frame = IDF | 0 | 0 | 0 | 0 |
| Set Initialization Frame = SIF | 0 | 0 | 0 | 1 |
| Request Initialization Frame = RIF | 0 | 0 | 1 | 0 |
| Non-Sequenced Information Frame = NSI | 0 | 1 | 0 | 0 |
| Non-Sequenced Response Frame = NSR | 0 | 1 | 0 | 1 |
| Initialization Termination Frame = ITF | 0 | 0 | 1 | 1 |

IDF is used only when the station is reserved for EIPL (station-to-station external initial program load). The Initialization Data Frame IDF is the only non-sequenced format frame where only the information field is transferred to the processor storage. The station receiving IDF is presently operating under NIM mode. Should this frame be received under NOM mode, the station will pass the frame to the processor as if it were a non-sequenced information frame NSI.

Set Initialization Frame SIF is used for EIPL allowing the EIPL host to notify the intended stations that EIPL procedure will start. There is no data field associated with this frame.

Request Initialization Frame RIF is the response frame generated by the station when confronted with demand frames prior to EIPL. RIF is also the demand frame resulting from IPL at power on and the encountering of any frames except initialization frames while in NIM mode. The only time the RIF is in use is while the station is in NIM mode. There is no data field associated with this frame. The receiver of this frame, being in NOM mode, will pass the frame to the processor as if it were an NSI frame.

NON-Sequenced Information Frame NSI is used for processor-to-processor communication without having to go through the normal data path. Depending on the host attachment's channel interface structure, the NSI frame may be transferred to the processor through data paths other than the normal cycle steal path.

Non-Sequencced Response Frame NSR is used as a response frame to a non-sequenced frame when the Response Required Final bit is encountered. There need not be a data field associated with this frame.

Initialization Termination Frame ITF is the last frame to be transferred in an initialization sequence. ITF is used to signal the station that all required initialization data has been transferred. There is no data field associated with this frame.

It should be noted that the term "initialization" in this section means loading of IPL data into a station's storage to enable its operation. This is different from loop initialization in which only the station modems are involved and which is necessary to get stations synchronized with loop operation, but does not involve the exchange or loading of data.

4. THE STATION

4.1 Basic Structure and Component Functions

Figure 4:
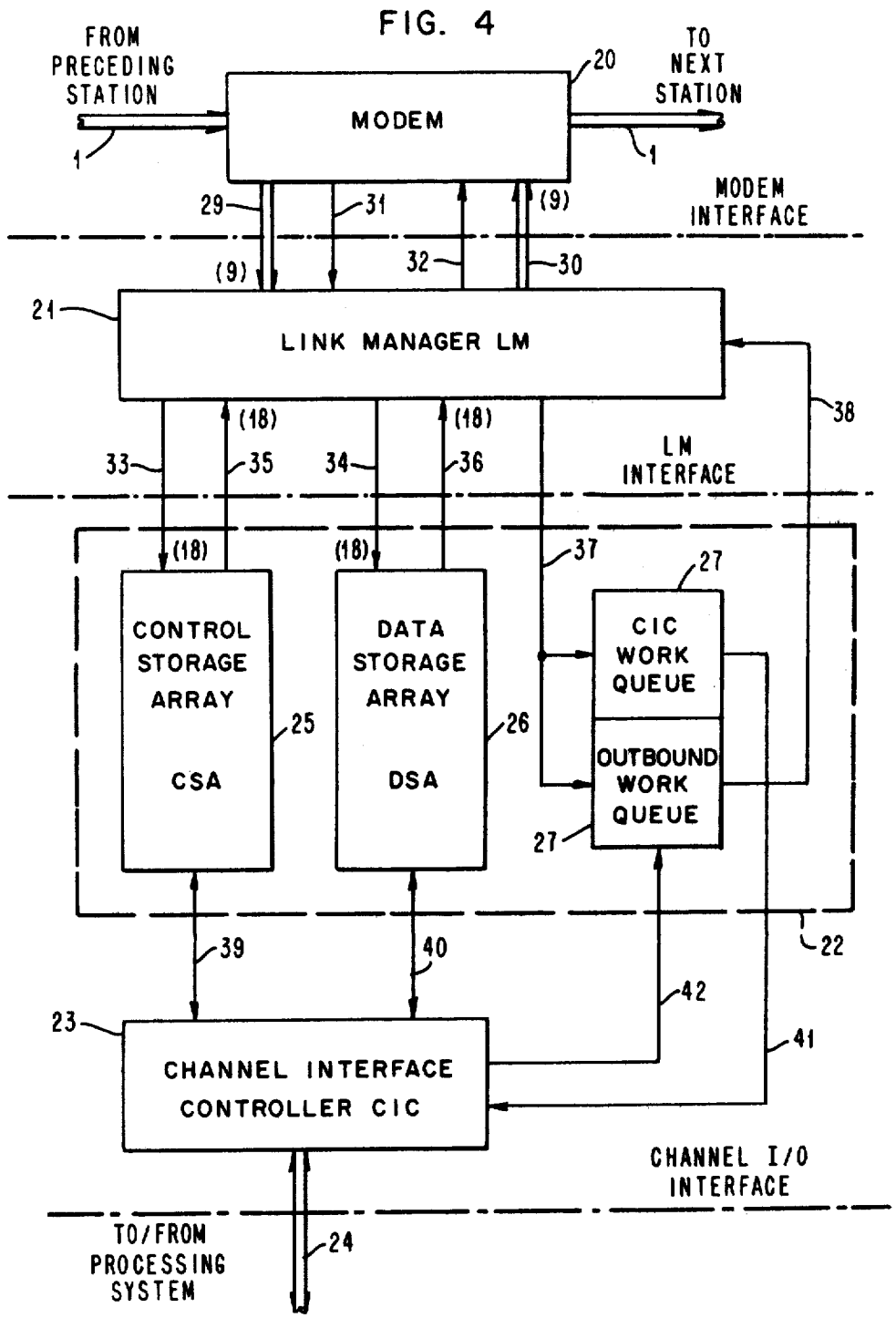
FIG. 4 Block diagram of a station connecting a processor to the loop.

Each of stations 2 . . . 7 of FIG. 1 is partitioned into four functional sections, namely a Modem 20, a Link Manager LM 21, a Storage Section 22, and a Channel Interface Controller CIC 23 as shown in FIG. 4. Channel Interface Controller 23 is connected to an I/O channel of the attached processing system by Channel Bus 24. Modem 20 is connected into communication loop 1 which is also termed "link" in the following.

Modem 20 handles technology dependent functions such as:
Information coding and modulation,
Link drive and receive,
Frame synchronization and data insertion,
Clock extraction,
Frame and data checking at the link level,
Link initialization and available frame insertion.

The Modem is described in more detail in section 5.

Link Manager LM 21 provides logical frame management functions such as:
Frame Structuring,
Address decode and encode,
Control field encode and decode,
Data blocking and deblocking,
Physical interface protocol sequencing and checking,
Data pacing.

Channel Interface Controller CIC 23 is the mechanism which interfaces the station with the processor I/O channel. It provides 16 subchannels for communication with up to 16 stations, and further provides functions such as:
Synchronizing with the channel I/O interface for data transfer,
Presenting the station logical interface to the processor,
Multiplexing control required amongst the 16 subchannels,
Device address mapping between the processor I/O interface and the station address.

Storage Section 22 comprises the following units: a Control Storage Array CSA 25, a Data Storage Array DSA 26, and Work Queue Storage WQS 27 for a CIC work queue and an outbound work queue.

Modem 20 and Link Manager 21 are interconnected by Inbound Data Bus 29, Outbound Data Bus 30, Control Lines In 31 and Control Lines Out 32.

Link Manager 21 and Storage Section 22 are interconnected by Control Array Input Bus 33, Data Array Input Bus 34, Control Array Output Bus 35, Data Array Output Bus 36, and further by Work Queue Bus In 37 and Work Queue Bus Out 38.

Channel Interface Controller CIC 23 is connected to CSA 25 by Control Store Bus 39, to DSA 26 by Data Store Bus 40, and to WQS 27 by Queue Output Bus 41 and Queue Input Bus 42.

As indicated in FIG. 4, there are three important interfaces in the station: The Modem Interface between Modem 20 and Link Manager 21, the Link Manager Interface between Link Manager 21 and Storage Section 22, and the Channel I/O Interface between the Channel Interface Controller and the host processing system's I/O channel.

4.2 Operation and Data Flow of Stations

It is the task of each station to allow any required exchange of data and commands between its attached local host processor and all other processors in the system which are attached to other stations. Simultaneous information exchange between one processor and several other processors must be possible, so that e.g. for example, processor A can transmit data to processor B and C while it receives commands from processor D.

The modem is the front-end that does the link access and blends out all technological and topological characteristics of the link mechanism. It does all synchronization and timing with respect to transmission on the link, CRC checking of frame contents, and determines whether data must be transferred from the link to the local host processor, and whether data from the local host processor can be dispatched on the link.

In each station, all other stations are treated as subchannels. The local station maintains a table (32 bytes) of status data for each of the other stations or subchannels in the control storage array of the storage section. For each transaction, i.e. receipt or transmission of information to or from another station, the Link Manager consults and updates these tables.

During transfer from processing system to the link or vice versa, data are buffered in the data storage array of the station. Each subchannel, i.e. each remote station, has a dedicated area in the data storage array of a local station.

As not all transactions can be executed simultaneously, pointers for waiting tasks are put into the outbound work queue and CIC work queue, and are removed from these queues sequentially.

The work queues are also the communication means between the Link Manager and the Channel Interface Controller.

For each frame received, the Link Manager uses the origin address to access the control storage array associated with the subchannel. It contains the information which allows the LM to determine:
If the subchannel is primed for the type of information contained in the frame.
If the station which originates the frame is ready for more data.
If the subchannel is in the appropriate operating sequence.
If the data buffers are available for data message handling.

The control byte in a frame indicates if the frame type is a Data Transfer, Regulatory, or Non-Sequenced Frame. When compared with the control array contents the LM can determine:
If the data is to be transferred to the attached host processing system.

If a response is appropriate.

If the data frames transferred have been received in the correct sequence.

With respect to an inbound frame, the primary functions of the Link Manager are to determine the validity of the current frame received, the request embodied in the current frame, the necessity of a response to the request, and proper shoulder tapping to the outbound work queue or the CIC work queue. Upon recognition of an incoming frame destined for the local station, the Link Manager decodes the type of frame and compares the result to the contents in the control array for determination of the type or request to make to the outbound work queue or CIC. It is the responsibility of the Link Manager to set up station information in the station status field of the control array for error condition reporting. The Link Manager checks the contents of the subchannel CR bits against the incoming frame CS bits for send or receive sequence number errors. The final response to a demand frame is made during the next frame cycle to allow time for error detection in the control information or data associated with the most recent frame received.

Initiative to transmit an outbound frame comes from the outbound work queue. When there is work in the queue, the LM accesses the queue at a predetermined time to obtain the necessary information. The times that the LM accesses the work queue are fixed, based on the byte time of each byte to be transmitted to the modem.

Information is placed into the queue by both the LM and CIC, and is accessed in First In First Out FIFO order. There is a maximum of 16 queue entries, with each entry containing 4 bytes of information.

With respect to an outbound frame the primary function of the Link Manager is to transfer the frame in proper sequence and report any error conditions resulting from the frame transfer.

An outbound frame transfer is initiated by the Link Manager. Whenever there is work in the outbound work queue and the Link Manager is in a position to transfer a frame, it issues a Request Frame Transfer (Local Transmit Request) to the modem. When the modem is ready to begin accepting the frame, it issues a Start Outbound Frame. Once the frame transfer starts, the Link Manager out-gates each byte of the frame at the Outbound Data Bus rate. When the last byte of information is gated out, the Link Manager issues a Last Outbound Byte Signal, indicating that the last byte for this frame transfer is on the Outbound Data Bus.

In order to prepare to transmit an outbound frame, the Link Manager obtains the necessary control information from the outbound work queue. This byte contains all the necessary information to control the outbound frame transfer. The destination address byte and the control field byte are also contained in the outbound work queue.

The Channel Interface Controller CIC formats three particular frame requests for the outbound work queue. A control frame request is formatted and placed into the queue whenever a read/write command is to be transmitted, as a result of fetching a new DCB. A non-sequenced frame request is formatted and placed into the queue whenever a non-sequenced frame is to be transmitted. A response frame request is formatted and placed into the queue whenever a response is to be transmitted, in order to clear a hold condition.

The Link Manager LM formats and places all types of frame requests into the queue, except those specific frames mentioned above. The LM formats and places into the queue all frame requests which result from a time out.

When a data frame is to be transmitted, there is a certain amount of interlocking between the LM and CIC, before the request is placed into the outbound work queue. This interlocking insures that a data frame is not transmitted before data is placed into the data buffer. Whenever the LM determined that a data frame should be formatted, it formats bytes 0, 1, and 2 of the outbound work queue, and also formats a fetch data request to the CIC. These 4 bytes of information are placed into the CIC work queue. When the CIC fetches the data and places it into the appropriate data buffer, the three bytes of information required by the outbound work queue are then transferred from the CIC work queue into the outbound work queue.

The Link Manager maintains a 20 byte counter in order to synchronize the frame transfer between the Link Manager and the modem, and to control its internal sequencing. In order to insure that each byte is transferred at the proper time, this counter is synchronized, once every frame time, with the modem. At a specified byte time, the modem sends a signal to the Link Manager, which is compared with the sequence counter. If there is a mismatch, the Link Manager takes appropriate action to insure that erroneous data is not sent out on the link or to the host processor.

In the event the modem loses sync, it sends a signal to the Link Manager, indicating that this condition exists. The Link Manager will continue to step the sequence counter, until a specified value is reached. At this time the counter is stopped until the Link Manager and modem can re-establish sync, before a re-start.

A frame retry mechanism is implemented in the Link Manager. A frame may be retried three times before the subchannel DCB is terminated with an error status. The components of the retry mechanism are a time-out stack, capable of simultaneously keeping track of time-outs for the 16 subchannels, and a retry count, located in the control storage array.

Whenever a Data Transfer type frame is transmitted, the time-out for that subchannel is started. When a response is received for that frame the time-out is stopped. However, if no response is received within 64 milliseconds, the time-out is flagged and the Link Manager will initiate a retry. Whenever a retry is initiated, the retry count is incremented by one.

The Link Manager performs three operations on the time-out stack in order to control the starting and stopping of time-outs. When a response frame is received by the Link Manager and there are no other frames outstanding on the link, for a given station, the time-out is stopped. When a response frame is received by the Link Manager and there are more frames outstanding on the link, for a given station, the time-out is restarted in order to account for the frames still outstanding on the link. When a data transfer type frame (DFF, DPF, Status, Control) is transmitted and there is no time-out in progress for a given station the time-out is started by the Link Manager.

5. THE MODEM

5.1 Survey of Modem

Modem 20 is provided for masking out the physical network characteristics and to synchronize the information transfer on the loop. Its functions include interfacing with the physical loop network, interfacing with the Link Manager, delimiting of frames, and initialization and error checking of all frames.

The Modem examines each frame for disposition in one of the following ways:
(a) The frame is forwarded unaltered for reception by another modem.
(b) The frame is received and interpreted.
(c) The frame is replaced by another frame intended for another modem.

Figure 5:
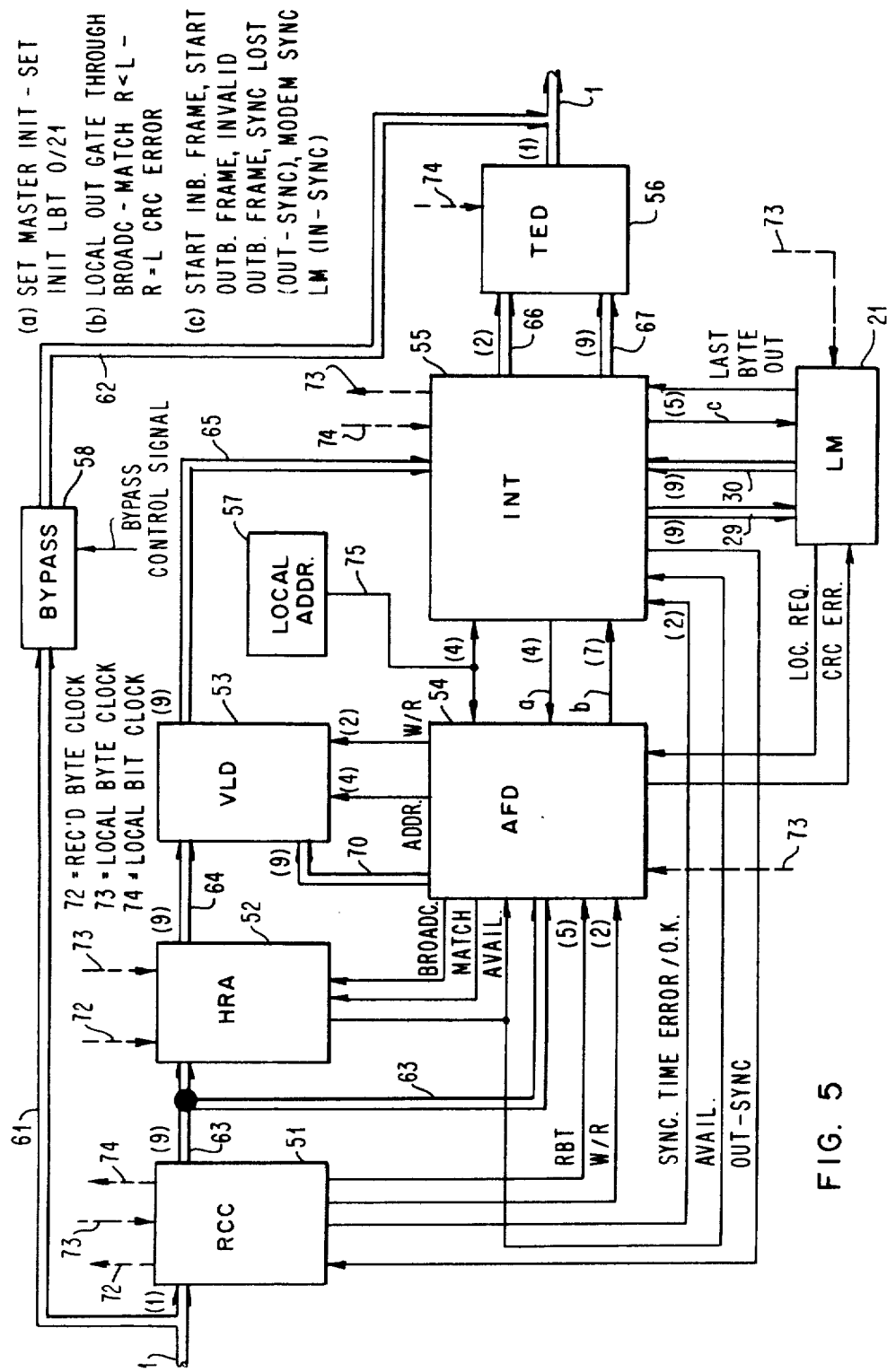
FIG. 5 Block diagram of the modem in a station.

FIG. 5 is a functional block diagram of Modem 20 showing the flow of data and control signals. Link Manager 21 is also shown in FIG. 5 for illustrating its interconnection with Modem 20 over the Modem Interface. Modem 20 comprises the following functional blocks:
Receiver Clock and Control Circuitry RCC 51,
Hold Register Array HRA 52,
Variable Length Delay Storage VLD 53,
Addressing and Frame Disposition Circuitry AFD 54,
Inbound/Outbound Interface Circuitry INI 55, and
Transmitting Encoder and Driver Circuitry TED 56.
A Local Address Selector Switch 57 is provided for manually setting each station's address.
A bypass circuit 58 is also provided.

Interconnections are represented as follows: Main data paths by double lines, control paths by single lines, and clock or timing paths by dashed lines. The actual number of parallel bit lines in each of these connections is indicated by a digit in parenthesis, if it is more than one.

The bit-serial link or loop 1 is connected at the modem input to RCC 51 and at the modem output to TED 56. Single-bit bypass lines 61 and 62 together with Bypass Circuit 58 constitute a bridge between input and output of the modem.

The modem internal main data path is nine bits wide and includes section 63 connecting RCC 51 and HRA 52, section 64 connecting HRA 52 and VLD 53, and section 65 connecting VLD 53 and INT 55. Between INT 55 and TED 56, there are provided a 2-bit wide path 66 for serialized data, and a 9-bit wide path 67 for sync character information. INT 55 and Link Manager 21 are interconnected by the two directional 9-bit wide data paths 29 and 30. Between VLD 53 and AFD 54, there is provided 9-bit wide path 70 for sync byte data updating. AFD 54 is also connected to RCC 51 by a branch of data path 63.

Three clock lines are provided for carrying clock signals between sections: line 72 for a Received Byte Clock from RCC 51 to HRA 52, line 73 for a Local Byte Clock from INT 55 to RCC 51, HRA 52, AFD 54, and Link Manager 21, and line 74 for a Local Bit Clock from RCC 51 to INT 55 and TED 56.

A 4-bit data path 75 is provided between Local Address Selector 57, and AFD 54 and INT 55.

All control lines between the different functional sections of FIG. 5 are identified by abbreviations for the signals they carry, and are not given individual reference numbers in FIG. 5.

The main functions of the functional sections of modem 20 as shown in FIG. 5 are listed below as a survey:

Receiver Control and Clock Circuitry 51 RCC

Detect sync characters
Derive received clock, and provide received byte count and received byte timing signals
Generate local clock, and adapt its rate to received clock
Recognize and deserialize incoming data bytes
Check correct mod. 21 arrival of sync characters
Provide READ and WRITE half cycle signals Hold Register Array 52 HRA Store two consecutive received bytes
Adapt byte stream between received clock rate and local clock rate
Gate received data to VLD
Convert sync character contents to sync byte data for input to VLD Variable Length Delay Storage 53

Store a window of the data stream comprising several bytes to obtain a required delay
(Minimum delay = 3 byte periods)

Addressing and Frame Disposition Circuitry 54 AFD

Derive delay pointer (for variable length delay)
Generate addresses for VLD to achieve required delay, and store delay pointer
Update sync character as determined by sync update signal
Compare incoming bytes to local address, to obtain signals for R=L, R<L, OA=L, DA=L
Decode incoming destination address DA to detect broadcast frame
Accumulate CRC for incoming frames and indicate any CRC error for unavailable frames
Determine disposition of incoming frames, to generate control signals for:
updating available/unavailable indication
gating through received frames
gating inbound data to Link Manager
gating outbound data from Link Manager to transmit section
Pass on READ/WRITE signals from RCC to VLD Inbound/Outbound Interface Circuitry 55 INT Provide local byte count and local byte timing signals from local clock signal
Gate data from VLD to transmit section or to Link Manager
Assemble outbound data stream (frames) from several sources
Insert local address, and generate and insert CRC character during initialization and for local outbound frames
Check validity of local outbound frames
Convert sync byte from VLD into sync character data
Serialize all outgoing bytes
Provide sync/resync procedure and a flywheel check procedure
Store status "in-sync" or "out-of-sync"
Detect temporary master status
Store status "initialization", "temporary master", "temporary slave" during loop initialization Transmitting Encoder and Driving Circuitry 56 TED Generate encoded signal from serialized data, including sync character with code violation from sync character data

Modem Interface Lines

The Modem Interface between Modem 20 and Link Manager 21 is characterized by transfer lines for following signals:

(a) Modem to LM:
Inbound Data (9 parallel bits)
Local Byte Clock
CRC Error (Invalid Inbound Frame)
Start Inbound Frame
Start Outbound Frame
Invalid Outbound Frame
Sync Lost (Link Invalid Sync)
Modem Sync LM (b) LM to Modem:
Outbound Data (9 parallel bits)
Local Transmit Request
Last Outbound Byte

5.2 Basic Operation of the Modem and Data Flow

The modem's operating procedure for receiving and transmitting data will now be described in connection with FIG. 5. Data are transmitted on the loop in serial form as shown in FIG. 3A. Receiver Control and Clock Circuitry RCC 51 detects waveform conditions and signal changes on the link and decodes the sequence of states into a sequence of 0 and 1 bits. These are accumulated in a Deserializer of RCC to obtain parallel bytes.

A complete byte will be shifted from the Deserializer Register of RCC 51 to a first Hold Register HR1 of Hold Register Array HRA 55, and subsequently to a second Hold Register HR2 of HRA. Using received clock for HR1 and local clock for HR2, this allows to adapt the data stream from one clock to the other.

From HR2, each byte is transferred to the Variable Length Delay Storage VLD 53 which is a buffer store for keeping data bytes for a selected time interval to achieve a desired delay. A read and a write control signal are furnished to VLD 53 at appropriate times. The number of bytes which are simultaneously kept in VLD 53 depends on the selected delay.

Addresses for accessing (writing or reading) VLD 53 are furnished by Addressing and Frame Disposition Circuitry AFD 54 The generation of these addresses, the delay selection, and the frame disposition mechanism are functions of AFD 54.

Data bytes read out of VLD 53 after the appropriate delay are sequentially placed on bus 65.

If the data, i.e. logical frame parameters Destination Address, Origin Address, Control Byte, and Information Field received in a frame are to be transferred to the respective station, (i.e., if destination address matches local address, or if it is a broadcast frame) Inbound/Outbound Interface Circuitry INT 55 will be conditioned to gate them from bus 65 to bus 29 for transfer to the station's Link Manager LM 21.

If no outbound data are to be transferred from the station to the link, bytes on bus 65 will be converted to 2-bit groups by INT 55, gated on transmit data lines 66 to Transmitting Encoder and Driver TED 56 and then applied to the link bit-sequentially in the form of an encoded signal as shown in FIG. 3A.

Such reserialization of received bytes and transfer to the link is effected in two situations:

(a) When the received frame is to be passed on to the next station without change (frame unavailable, Destination Address not matching), (b) When data (logical parameters) in the received frame where stripped off and transferred to the respective station (Destination Address matching). In this case, however, the frame is changed from unavailable to available by appropriate marking in the Sync Character, as will be explained in a later section.

If outbound data are ready for transmission in the station's Link Manager, and if the frame was either marked available or was addressed to the respective station, Inbound/Outbound Interface Circuitry 55 will be conditioned to accept these data on bus 30, convert them to a sequence of bit pairs and gate them to transmit data lines 66 for transfer to TED 56 from where it is transmitted on the link. In this case, data bytes on bus 65 will not be used and are thus destroyed. CRC character information and also the local station address (i.e. the origin address) will be furnished by INT 55.

Sync Character Handling

The sync character received as head of each frame is handled different from the other characters, because it comprises the code violation. The sync byte stored in VLD 53 is different from the received sync character.

The code violation which is an unnormal state sequence extending over four bit periods as shown in FIGS. 3B and 3C is recognized by the circuitry in RCC 51. This results in a respective signal on one of lines 63 to HRA 52. This indication is passed on through HRA 52 over lines 64 to VLD 53. The actual sync byte stored in VLD 53 in response to the received sync character has the following format:

| Bit No. | 0 | 1 | 2 | 3 | 4 | 5 | 6 | 7 | P |
|---------|---|---|---|---|---|---|---|---|---|
| Function | X | X | X | B | PDA | POA | M | A | S |

Function designations have the following meaning:
X = Not used (reserve)
B = Broadcast frame (Received Destination Address is broadcast address)
PDA = Destination Address Parity (as received)
POA = Origin Address Parity (as received)
M = Match (Local Address matches with Destination Address)
A = Frame Available (Availability Bit as received)
S = Sync Byte Indicator (occupies parity bit position)

The Broadcast and Match indicators B and M are derived in AFD 54 as will be explained later. The final coded sync byte is then furnished on lines 64 for storage in VLD 53. It may be updated by information presented on lines 70 from AFD 54.

The sync byte is not transferred from VLD 53 to the station. However, for frames to be passed on from VLD 53 to TED 56, the sync byte is read out over bus 65 to INT 55 which transfers the respective information (Availability, DA parity, OA parity) over lines 67 to TED 56. The latter generates from this information the sync character to be transmitted over the link, including code violations, as shown in FIGS. 3B and 3C. For frames carrying outbound data from the respective station, sync character information is transferred to AFD 54 and then used to update the sync byte via lines 70 in VLD 53. (Non-available/available indication, DA and OA parities). It is later transferred to TED 56 which then generates the sync character signal.

Cyclic Redundancy Check CRC

A cyclic redundancy check is made for each received frame in AFD 54. Over 19 bytes of each frame, i.e. the logical frame parameters (DA, OA, C, INFO), AFD 54 accumulates CRC data in respective circuitry. When the 20th byte (CRC character) is received, it is combined with the CRC data of the frame. A check is then made—if the frame was unavailable—whether a specific bit pattern is present. If this is not true, an error indication is transferred to Link Manager 21.

For outbound data from the station, INT 55 accumulates a CRC character over the 19 logical frame parameter bytes. It then adds the accumulated CRC character as 20th byte of the frame to the data stream transferred to TED 56.

Module 21 (Mod. 21) Count and Byte Timing

As was mentioned already, there exist two clocks in each modem: a Received Clock and a Local Clock. The basic clocks are generated in RCC 51 from the received data and from a local oscillator, and the clock rates are adapted to each other by occasional skipping of pulses in one of the clocks.

Two byte timing and modulo 21 counting units are provided in the modem: one in RCC 51 for the Received Clock, and one in INT 55 for the Local Clock. Their patterns are the same but they have a phase shift which corresponds to the delay in VLD 53 plus a two-byte delay in HRA 52. Their relative phase is adjusted during the synchronization procedure.

The Received Byte Time Signals of RCC 51 control operations in RCC 51, AFD 54 and in half of HRA 52, namely Hold Register 0. The Local Byte Time Signals control operations in INT 55, VLD 53 and other half of HRA 52, namely Hold Register 1. The delay is preselected during initialization and stored as Delay Pointer in AFD 54.

A check is made in RCC 51 whether sync characters arrive correctly at mod. 21 intervals, to cause resynchronization if necessary.

6. THE STORAGE SECTION

6.1 Storage Units and Subchannel Concept

As was mentioned above already, Storage Section 22 comprises Control Storage Array (CSA) 25, Data Storage Array (DSA) 26 and Work Queue Storage WQS 27. A few details will be given for each of these units in the next section.

It was also mentioned already that in each station, the other stations of the system are treated as subchannels. Both CSA 25 and DSA 26 have a dedicated area or subsection for each subchannel, i.e. for each of the other, remote stations. Therefore, control information and data in transfer can be kept separate by subchannel, thus allowing simultaneous connections to exist, and enabling interleaved communication transactions with several partner stations.

It is assumed for the present embodiment that 16 subchannels are provided in each station.

CSA 25 as well as DSA 26 can be accessed by both the Link Manager and Channel Interface Controller, and both can generate addresses and read and write control signals for the storage arrays.

6.2 Structure and Contents of Control Storage Array CSA

Control Storage Array CSA 25 comprises one subsection for each subchannel (thus there are 16 subsections). Each subsection includes 16 words WD of 16 bits each. The following table shows what kind of control and status information is held in the CSA for each subchannel.

WD 00/01 Station State Field SSF
WD 02 Link Transfer Count LTC
WD 03 Data Retry Address RA
WD 04 Local Station Status (1 Byte) & Origin Station Status (1 Byte)
WD 05 Interrupt Level and Mask (1 Byte)
WD 06 Interrupt Information Byte & Interrupt Condition Code CC (1 Byte)
WD 07 Reserved
WD 08 Various Indicators
WD 09 Device Parameter 1: Destination Address and Control Byte
WD 10 Device Parameter 2: Inbound DPF Count
WD 11 Device Parameter 3: DCB Identification for progr.-contr. interrupt
WD 12 Device Parameter 4: Status Address
WD 13 Device Parameter 5: Chain Address
WD 14 Word Count in Message
WD 15 Main Store Address of Message The Station State Field SSF (WD 00/01) contains in concise form the information mainly required by Link Manager and CIC and is accessed by the LM for each transaction. Its contents is explained in somewhat more detail in the next section. The Link Transfer Count LTC (WD 02) indicates for a sequence of data transfers concerning a single block of information how many bytes were transferred already. The Data Retry Address RA (WD 03) points to the storage location from where transfer must be restarted if an error occurred during transmission. For data up to that location, acknowledgement was received. The fifth word (WD 04) contains additional status information on the local station and the subchannel's remote station. The next three words (WD 05 ... WD 07) are provided for information that is required in connection with interrupts.

The second half of each subchannel subsection in CSA, i.e. WD 08 ... WD 15, comprise the Device Control Block DCB. This is generated by software in the host processor, loaded at command time, and is activated and updated for each frame transfer or fetch.

6.3 Details of Station State Field SSF

The 32 bits of each Station State Field are used as follows:
Word 00:
Bits 0/1 = Station State: Specifies whether the station has been activated by the attached processor, and if so whether it has been activated for a read or write operation.

Bit 2 = Retry: Used by the Link Manager to indicate to the CIC that one or more frames in the last data exchange were retried.

Bits 3/4 = Channel Interface State: Provides a running account of the subchannel interface states when operating on the processor I/O interface (available/command transfer/data transfer/completion transfer).

Bits 5/6 = Buffer Control: Identifies the status of the data buffers. On read operations the buffers are loaded by the LM, on write operations by the CIC. Data for non-sequenced frames are always loaded into buffer 0 locations. The four states are: Empty/buffer 0 full//buffer 1 full/both full.

Bit 7=Hold/Retry: Identifies the receipt of a hold frame or a retry condition. Reset only on receiving a response frame with proper CS and CR bits.

Bit 8=Non-Sequenced Frame Received.

Bits 9/10/11=Station Link Status: Identifies current operational status of the link. It is used heavily by the Link Manager to ensure proper protocol on the link (Important for distinguishing the three states in each data exchange, i.e. initiation, transfer sequence, and termination).

Bits 12/13=Send Sequence Count CS.

Bits 14/15=Receive Sequence Count CR.

Word 01:

The second word of SSF mainly contains three bits for a time-out retry count TOR. This is used to keep track of the number of time-outs that have occurred in the subchannel for the denied frames sent. The maximum time-out retry count allowed is three.

The remaining bits are in reserve and can be used for special purposes.

6.4 Structure and Contents of Data Storage Array DSA

Data Storage Array DSA 26 comprises (like the Control Storage Array) one subsection for each of the 16 subchannels. Each subsection includes two buffers, each holding 16 bytes of data (i.e. totally 32 bytes for each subchannel).

The two buffers of each subsection can be used in an alternating fashion: While the Link Manager may write the 16 data bytes taken from the information field of one frame into one of the buffers, the Channel Interface Controller can read from the other buffer 16 previously loaded bytes and transfer them via the I/O Channel Interface to the processor.

Alternating use of the two buffers is of course also possible in the opposite direction for transfer from processor to the link. Simultaneous transfer in both directions will never occur.

6.5 Work Queues WQ's

Work Queue Storage WQs 27 is partitioned into two sections: A CIC Work Queue Store and an Outbound Work Queue Store. Both work queue stores are used in a FIFO manner.

Tasks for the Channel Interface Controller are entered into CIC WQ by the Link Manager and extracted sequentially by the CIC. Tasks for the Link Manager and necessary information are entered into the Outbound WQ by the CIC and the LM, and are extracted by the LM sequentially.

Total capacity of WQ storage is 64 positions each including four 8-bit words. Of the 64 positions, 48 belong to the CIC WQ and the remaining 16 belong to the Outbound WQ.

Access to each queue is controlled by a pair of 8-bit address counters, indicating the next position to be written or read, respectively. Each counter is subdivided into a 6-bit and a 2-bit section, which define the queue position and the word within the queue position. A compare circuit checks for an equal condition between the 6-bit sections of the counters. If the counters are equal and the last request to the queue was a write operation, the queue is full. If the counters are equal and the last operation was a read, the queue is empty. If the counters are not equal, one or more work requests are pending in the queue. If 2 or more words are required from a queue position, the 2-bit counters are incremented to form the complete address for the desired word or words. When the operation on the queue is finished, the 2-bit counter is reset to zero and the 6-bit counter is incremented. In this manner, the compare circuit will not indicate a change in the queue status until the entire operation is completed. The 6-bit counter for the CIC Work Queue is modified so that it cycles through 48 distinct states by altering the sequence of the positions of the counter. The corresponding positions in the Outbound Work Queue 6-bit counter are forced to the state not occupied by the CIC counter. In this manner, the counters form two circular FIFO structures containing 48 and 16 positions respectively.

Channel Interface Controller CIC Work Queue Entries

Each four-byte entry in any of the 48 positions of the CIC WQ comprises the following information:

Byte 0:
    4 bit Subchannel identification SCID
    4 bit CIC command

Byte 1:
    4 bit Subchannel identification SCID
    1 bit Buffer 0/1 indicator BFR
    2 bit Information field length indicator CNTL (0 byte/1 byte/16 bytes)
    1 bit Time-out control bit STO (for response-requiring frames)

Byte 2: 8 bit Destination address DA

Byte 3: 8 bit Control byte C

Channel Interface Controller CIC Commands

The four bits for CIC command allow to distinguish the following 15 different commands for the Channel Interface Controller:

Store Data Transfer (Buffer 0 or Buffer 1)
Fetch Data Transfer (Buffer 0 or Buffer 1)
Store Partial Frame (Buffer 0 or Buffer 1)
Retry Partial Frame (Buffer 0 or Buffer 1)
Issue Status of Subchannel
CIC Interrupt Processor
Detected Error on Data Outbound
SIF Received (Set Initialization)
Initialization Data Frame IDF (Buffer 0 or Buffer 1)
ITF Received (Initialization Termination)

Outbound Work Queue Entries

Each four-byte entry in any of the 16 positions of the Outbound WQ comprises the following information:

Byte 0
    4 bit Subchannel identification SCID
    1 bit Buffer 0/1 indicator BFR
    2 bit Information field length indicator CNTL (0 byte/1 byte/16 bytes)
    1 bit Time-out control bit STO (for response-requiring frames)

Byte 1: 8 bit Destination address DA

Byte 2: 8 bit Control byte C

Byte 3: 8 bit Status byte (information for status frames)

7. THE LINK MANAGER LM

7.1 Main Functions

Main LM purpose of the Link Manager is to provide link protocol functions and logical frame management.

These and other functions were already briefly described in section 4 above.

The Link Manager LM analyzes control bytes of received frames, places the data into DSA buffers and maintains current status information for each subchannel in the CSA. It formulates control bytes for outgoing data transfer frames and extracts for these frames the data from DSA buffers. It was mentioned above already that the Link Manager LM enters tasks for the Channel Interface Controller, as demanded by frames received on the link, into the CIC Work Queue, and gets its own tasks from an Outbound Work Queue.

All of the Link Manager functions are provided in hardware, to enable fast operation that is necessary for a unit that serves 16 subchannels in multiplex.

The Link Manager and its frame handling operation are described in somewhat more detail in the following sections.

7.2 Functional Units and Data Flow

Figure 6A:
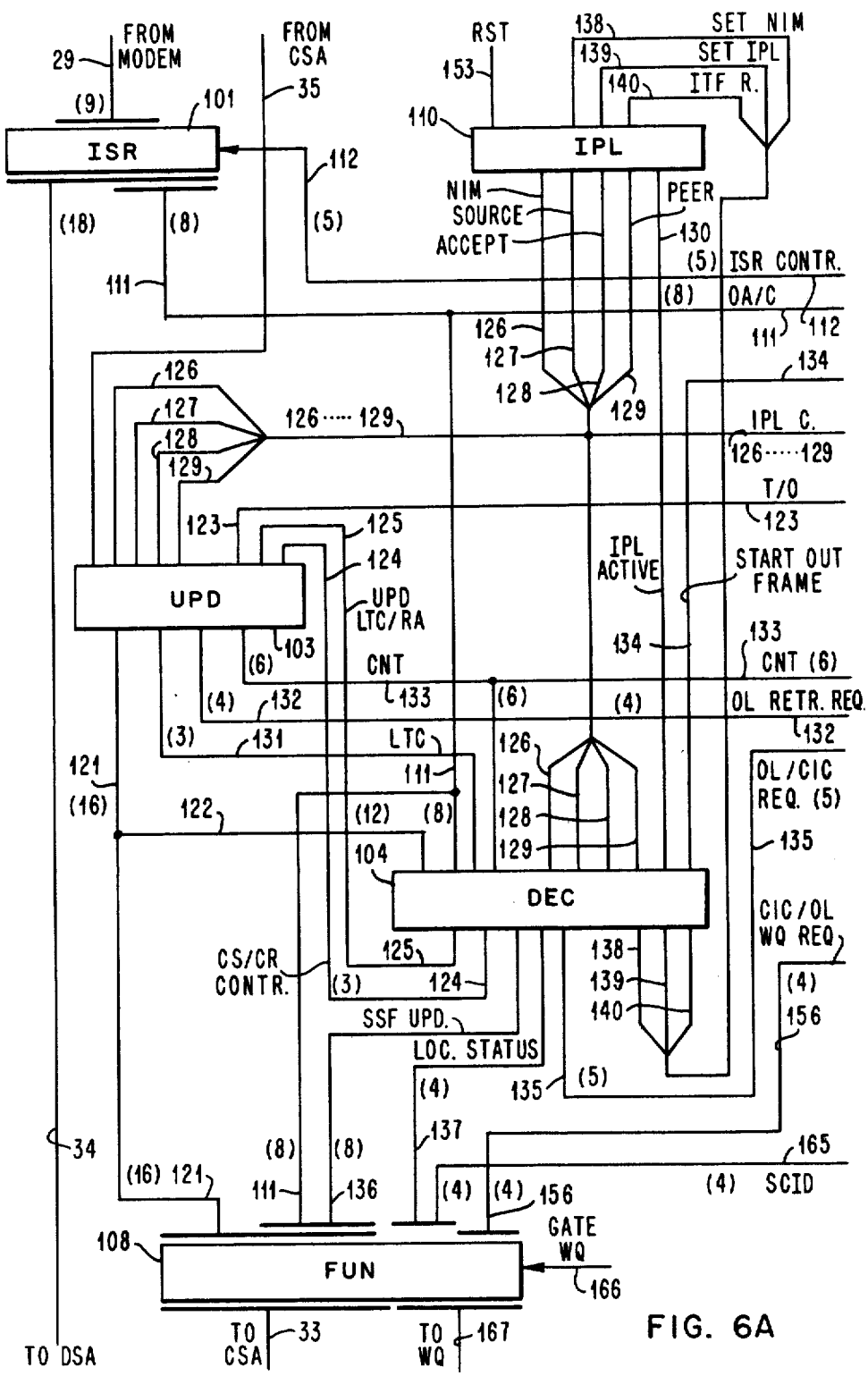

The main functional units of the Link Manager, their interconnections and the data flow will now be described in connection with FIGS. 6A and 6B. The functional units shown are Input Staging Register ISR 101,
Output Staging Register OSR 102,
Updating Unit UPD 103,
Decoder and Status Monitor DEC 104,
Sequence Controller SCT 105,
Work Queue Response and Encoder Unit ENC 106,
Address Register and Funnel ADR 107,
Funnelling and Latching Unit FUN 108,
Time-out Stack TOS 109, and
Remote IPL Control Unit IPL 110.

Input Staging Register ISR 101/Output Staging Register OSR 102

All data incoming from and outgoing to the Modem are passed through the two register units IRS 101 and OSR 102. Both comprise two 8-bit (plus parity) register sections, i.e. each can hold two data bytes.

Input to ISR 101 is the 9-bit data bus 29 from the Modem. It can be gated to either of the two byte sections. One output is the 18-bit data bus 34 to the Data Storage Array DSA 26. Another output is an 8-bit bus 111 connected to DEC 104 and to FUN 108 for transferring a control byte and to ADR 107 for transferring an origin address. Five control lines 112 for input/output gating selections are connected to ENC 106.

One input to OSR 102 is the 18-bit output bus 36 from Data Storage Array DSA 26. Another input is the 8-bit output bus 38 from Work Queue Store 27 for transferring the destination address and the control byte from a WQ entry into an outbound frame. Output from OSR 102 is the 9-bit data bus 30 to the Modem, which can be selectively connected to either of the two register sections. Five control lines 113 for input/output gating selections are connected to ENC 106.

Updating Unit UPD 103

Updating Unit UPD 103 provides following functions:

Buffering Station State Field SSF from Control Storage Array CSA
Adjusting sequence counts CS and CR after receipt or transmission of each sequenced frame
Increasing retry address RA for the Data Storage Array in accordance with progress of successful transmissions (sequence count checking)
Decoding and updating link transfer count LTC which reflects the number of bytes that were already transmitted during the respective data transfer sequence
Counting modulo 20 (for correct frame/byte sequencing)

Most important tasks of UPD 103 are:

(1) Buffering the Station State Field fetched from the Control Storage Array for the respective subchannel involved in a current transaction, furnishing selected information thereof to Decoder 104 for status checking and control operations, updating the SSF to reflect the executed transaction (e.g. increasing sequence counts), and retransferring the updated SSF to CSA.

(2) Maintaining a modulo 20 count in synchronism with the frame transactions, and furnishing the current value to other functional units of the Link Manager.

Main input to UPD 103 is the 18-bit bus 35 from Control Storage Array CSA 25. Main output is a 16-bit bus 121 connected to the input of FUN 108 (which leads back to CSA 25). A 12-bit branch 122 of bus 121 is connected to the input of DEC 104. Other inputs to UPD 103 are: a retry request line 123 from TOS 109 (1 bit), CS/CR control code lines 124 from DEC 104 (3 bit), update LTC/RA control line 125 from DEC 104 (1 bit), and four local station mode lines 126, 127, 128 and 129 from IPL 110 for indicating whether the station is in NIM mode, whether it is an IPL Source station, whether it is an IPL Acceptor station, and whether it is an IPL Peer station (These modes are relevant for remote IPL). Other outputs from UPD 103 are: LTC code lines 131 to DEC 104 (3 bit), outbound link retry request lines 132 (4 bit) to ENC 106, and six lines 133 for the current mod. 20 count value, leading to units DEC 104, SCT 105, and ENC 106.

Decoder and Status Monitor DEC 104

Decoder and Status Monitor DEC 104 provides following functions:

Decoding of control byte of inbound frames
Decoding of parts of the SSF available in UPD 103
Monitoring compatibility between current subchannel status (and local station status) and the action required by incoming frame.

Thus, this unit develops the control signals for the next operations as dictated by the C byte of the frame just received through the modem and by the current status, and it generates control signals to avoid any transaction and status changes if the intended actions do not fit the presently existing status (e.g. arrival of data from remote station when local station was just prepared to transmit data to the respective remote station). It further provides updating signals for the Station State Field in CSA.

Main inputs to DEC 104 are 12-bit bus 122 from UPD 103 for Selected Subchannel Status data, and the 8-bit output bus 111 from ISR 101 for control bytes. Other inputs are: LTC code lines 131 from UPD 103 (3 bit), local station mode lines 126, 127, 128 and 129 from IPL 110 for indicating NIM mode, IPL Source and IPL Acceptor and IPL Peer Acceptor Status, line 130 indicating "IPL Active" state, six Mod. 20 count lines 133 from UPD 103, and "Start Inbound Frame" control signal line 134 from the Modem.

Output lines from DEC 104 include: CS/CR control code lines 124 to UPD 103 (3 bit), updata LTC/RA line 125 to UPD 103, outbound link/CIC request lines 135 to ENC 106 (5 bit), and eight plus four main output lines 136 and 137 to the Funneling and Latching Unit 108, of which eight carry information for the Control Storage Array (two buffer status bits, three Station Link Status SLS bits, and a freeze, Q bus, and hold bit), and four carry information for the Work Queue (local status code).

There are further three output lines 138, 139 and 140 for transferring control signals "set NIM mode", "set IPL Active mode", and "ITF received" to Remote IPL Control Unit 110.

Sequence Controller SCT 105

Sequence Controller SCT 105 mainly furnishes address sequences for stepping through storage locations in a particular subchannel's subsections in CSA and DSA during one frame transaction, and the necessary read and write signals.

Its input lines include: Retry request line 123 from Timeout Stack 109, four local station state lines 126, 127, 128 and 129 from IPL 110 indicating NIM mode, and IPL Source/IPL Acceptor/IPL Peer States of the respective station, the six mod. 20 count value lines 133 from UPD 103, four control signal lines from the modem, i.e. line 141 for "Start Outbound Frame", line 142 for a synchronization signal, line 143 for "Invalid Outbound Frame", and line 144 for "Loop Sync Lost", and a System Reset line 153.

Output lines are: eight addressing control lines 145 for Address Register 107 (five for hold control and three for gate control), six CSA access control lines 147 of which four carry the low part of the CSA address (location within subchannel subsection), and two carry the CSA read/write control signals, six DSA access control line 149 of which four carry the low part of the DSA address (location within subchannel subsection) and two carry the DSA read/write control signals, and three sequence control signal lines 151 of ENC 106.

Work Queue Response and Encoder Unit ENC 106

Work Queue Response and Encoder Unit ENC 106 is mainly provided for furnishing Work Queue input and control signals and ISR/OSR control signals in response to coded requests from UPD 103 and DEC 104, in response to some WQ output signals, and in response to control signals from the Modem.

Inputs to ENC 106 are: outbound link/CIC request lines 135 from DEC 104 (5 bit), outbound link retry request lines 132 from UPD 103 (4 bit), sequence control signal lines 151 from SCT 105 (3 bit), a line 152 from the modem for a control signal "CRC Error", a system reset line 153, four lines 154 furnishing WQ output information from Address Register and Funnel ADR 107, and the mod. 20 count value lines 133 from UPD 103 (6 bit).

Outputs from ENC 106 are: five ISR control lines 112 and five OSR control lines 113 (these signals control gates in ISR 101 and OSR 102 for selecting the appropriate source and destination during each byte time of a frame cycle), two Work Queue control lines 155 (request WQ OL/CIC, which are part of Work Queue bus 37, and four Work Queue input signal lines 156 (CIC-/OL WQ request) connected to Funnelling and Latching Unit 108, which will transfer these signals to Work Queue Storage 27. There are further provided two output lines for control signals to the modem, which are line 157 for the transmit request signal for an outbound frame, and line 158 for the signal "Last Byte Out" indicating last information byte time of a frame.

Address Register and Funnel ADR 107

Address Register and Funnel ADR 107 provides following functions:
Storing the origin address QA of an incoming frame, for subchannel selection in CSA and DSA during the inbound frame cycle
Funnelling the subchannel identification SCID for an outbound frame from the Work Queue entry to addressing circuitry of CSA and DSA for subchannel selection
Funnelling the SCID to Time-out Stack 109 for subchannel selection (for outbound frames requiring a response)
Storing a subchannel identification from TOS 109 when a Time-out occurs, for addressing the respective subchannel sections in CSA and DSA, and for furnishing it to the Work Queue, and
Funnelling 4 bits of the first byte of each WQ entry into ENC 106 for controlling LM operation.

Inputs to ADR 107 are: 8-bit output bus 111 from ISR 101 (for transferring an OA), 8-bit output bus 38 from Work Queue Store 27 (for transferring an SCID), and four subchannel ID lines 161.

Outputs from ADR 107 are: Four WQ output signal lines 154 to ENC 106, four address lines 162 to CSA 25 and four address lines 163 to DSA 26, for transferring the high four bits of CSA/DSA address (i.e. the bits selecting the subchannel subsection in CSA and DSA, respectively), four subchannel ID lines 164 to TOS 109, and four subchannel ID lines 165 to FUN 108 (for transfer to the Work Queue input).

Funnelling and Latching Unit FUN 108

Funnelling and Latching Unit FUN 108 provides an output path from several Link Manager Units to the Control Storage Array CSA and to the Work Queue Storage. It latches the received signals so that they are available for transfer to CSA and WQ during a sufficiently long period of time.

Input lines to FUN 108 are: 16-bit bus 121 from UPD 103 (for status data), eight plus four bit lines 136 and 137 from DEC 104 (also for status data), 8-bit bus 111 from ISR 101 (for control bytes of non-sequenced frames which are to be transferred to the CSA), four WQ input signal lines 156 from ENC 106, and four subchannel ID lines 165 from ADR 107 (transferring a subchannel ID from Time-out Stack TOS 109 when a time-out occurs). A gating signal line 166 is provided for controlling the gating of WQ destination data to the WQ bus.

Output lines of FUN 108 are: 18-bit bus 33 to Control Storage Array 25, and eight lines 167 (in output bus 37) to Work Queue Storage 27.

Time-Out Stack TOS 109

Time-out Stack TOS 109 provides 16 simultaneous time-out functions for the 16 possible subchannels. A time-out operation is started by furnishing the respective subchannel ID (SCID) on four input lines 164 from ADR 107, and a start signal on control input line 168. A time-out operation can be cancelled by providing the respective SCID on lines 164 and a stop signal on control input line 169. A predetermined time interval after any time-out start, a time-out signal appears on output line 123 which leads to UPD 103 and to SCT 105 (for starting retry operations), and simultaneously the respective SCID is furnished on four output lines 161 for transfer to ADR 107.

Remote IPL Control Unit IPL 110

Remote IPL Control Unit IPL 110 is provided for indicating whether the respective station is a remote IPL Source or Acceptor, whether it is a Peer IPL Acceptor or a Slave IPL Acceptor, whether it is in non-intelligent mode NIM or normal operating mode NOM, and whether it is just in a status of being remotely loaded IPL data.

IPL 110 mainly contains three jumpers and two latches. The jumpers are set manually for determining the IPL type of the station, and the latches are provided for indication "NIM" mode and "IPL Active" status.

Input to IPL 110 are: three IPL control lines 138, 139 and 140 from DEC 104 for signals "set NIM", "set IPL" and "ITF received"; and the system reset line 153.

Output lines from IPL 110 are: A line 126 indicating NIM Status, a line 127 indicating IPL Source Status, a line 128 indicating IPL Acceptor Status, a line 129 indication Peer IPL Acceptor Status (or Slave IPL Acceptor Status if not activated), and a line 130 indicating status "IPL Active", i.e. initial program load in progress. These four control lines are connected to inputs of UPD 103, DEC 104, and SCT 105. For an alternative solution line 130 could also be directly connected to the Channel Interface Controller to allow immediate actions in the CIC and transfer of an IPL signal to the processor when the IPL Active Status begins.

7.3 Flow of Frame Fields for Inbound and Outbound Frames

To simplify understanding of the frame handling operations which are described in the following sections, a survey is given below of the flow of the individual fields of a frame, or more particularly a survey of their destinations (inbound) or origins (outbound).

Frame field designations and functions were given already in section 1.3 but are briefly reviewed here:

S=Sync Character/DA=Destination Address-/OA=Origin Address/C=Control Byte/INFO=Information (16 data bytes)/CRC=Frame Check Character.

Inbound Frames

S: Stays in Modem. Controls timing, and releases outbound frames (if available).
DA: Used only in Modem. Controls gating of frame contents (OA, C, INFO) into station (if address matches).
OA: Transferred to Link Manager. Addresses CSA and DSA for subchannel selection.
C: Transferred to Link Manager for sequenced frames. Controls LM operation and formulation of work requests for CIC. Part of information entered into CSA. Transferred to CIC and Host Processor for non-sequenced frames to control special operations.
INFO: Transferred into Data Storage Array. From there extracted by CIC for transfer to Host Processor storage.
CRC: Stay in Modem where check is made. Only result signal transferred to LM.

Outbound Frames

S: Formed in Modem.
DA: Extracted from Work Queue. Formed by Link Manager for data transfer frames, response frames, and time-out frames. Formed by Channel Interface Controller for control frames and non-sequenced frames.
OA: Inserted by Modem (fixed station address).
C: Extracted from Work Queue. Formed by Link Manager for data transfer frames, response frames, and time-out frames. Formed by Channel Interface Controller for control frames and non-sequenced frames.
INFO: Extracted from Data Storage Array. Transferred to DSA from Host Processor by CIC.
CRC: Generated in Modem.

7.4 Handling of Inbound Frames by the Link Manager

When a frame is received by the modem which is addressed to the respective station, the Link Manager is notified by the signal Start Inbound Frame for starting the necessary operations. Bytes of the frame enter the Link Manager through ISR 101. The Origin Address is transferred to ADR 107 for selecting the subsections in Control and Storage Array Data Storage Array DSA associated with the sender of the received frame. The control byte is transferred into DEC. Data bytes from the INFO field are transferred into a DSA buffer, as addressed by the contents of ADR 107 (subchannel selection) and SCT 105 which sequentially addresses the locations within the buffer.

Control Storage Array CSA is also addressed by the contents of ADR 107 and by SCT 105 to first fetch the Station State Field of the subchannel and store it in UPD 103. Control Field C byte and Station State Field SSF are decoded to develop control and updating signals are required (SSF is partially transferred into DEC 104). Subsequent further bytes are then fetched from CSA as required.

A check is made whether the action required by the control byte fits to the present status, i.e. whether the transaction was correctly initiated by a control frame. Station Send Sequence CS and Station Receive Sequence CR counts are compared, LTC and retry address updated if appropriate, and also CS and CR are updated. If an incorrect condition or error is encountered, updates are reversed and the transaction is stopped. Respective indications are put into the control block.

When the frame requires an action by the CIC (which is e.g. the case for received data), a coded request is transferred to ENC 106 which in its turn formulates a coded entry for the CIC Work Queue (CIC command). The subchannel identification for the CIC WQ entry is transferred from ADR 107. The entries are gated by FUN 108 to the WQ. If a response frame must be returned to the sender, a respective entry for the Outbound Work Queue (Link Manager task) is formulated in a similar manner by ENC 106.

At the end of the frame, the updated CSA information (i.e. SSF) is returned to the Channel Storage Array.

Further handling of the received data, i.e. transfer into processor storage, is done by the CIC when it accesses the corresponding Work Queue entry after it has reached the top of the queue. Channel Interface Controllers CIC than can also access the CSA information for the respective subchannel, which information will then direct further actions, and which may be also updated to reflect the operations completed by CIC.

7.5 Handling of Outbound Frames by the Link Manager

For frames that are to be transmitted from the station over the link, an entry has to be entered into the Outbound Work Queue from where Link Manager sequentially gets its tasks. For certain types of frames, the Link Manager formulates the Work Queue entries by itself (e.g. consecutive data transfer frames after an initial control frame). For other types of frames, the entries
including control byte and destination address-are formulated by the CIC and placed into the Outbound Work Queue.

For data transfer frames, the necessary data will be prefetched from the processor and entered into the DSA buffer in cooperation between CIC and LM.

The Link Manager notifies the Modem if it needs a frame for transmission, by the Transfer Request signal. When a frame becomes available, the Modem activates the Start Outbound frame signal.

The Link Manager, stepped by SCT 105, then first transfers the first byte of the Work Queue entry into ADR 107. The SCID is then available in ADR 107 for accessing the CSA and DSA, with sequential location addresses generated by SCT 105. The SSF is again examined and updated, as well as other status data. If the STO bit is on in the WQ entry, the SCID is sent to TOS 109 and a time-out started for the respective subchannel.

All bytes which must be transferred to the Modem must pass through OSR 102. Gates are opened to first release the destination address and the control byte which are available in the Work Queue, to the Outbound Staging Register OSR. Thereafter, the output bus of DSA is gated to OSR. The DSA buffer is also addressed by the SCID in ADR 107 and by further address bits (which select sequential locations in DSA) from SCT 105. Thus, all bytes are gated from the buffer into an INFO field of a frame, and returning the updated control data to CSA ends execution of the respective task in the Link Manager.

7.6 Handling of Non-Sequenced Frames

For non-sequenced frames, actions are similar, with the distinction however that no CS and CR counts are sent, checked or updated, and the control byte and origin address are stored completely in the CSA for inbound frames so that they can be transferred to the processor, and for outgoing frames control byte and destination address are generated in the processor and placed into CSA for subsequent transfer into the Outbound Work Queue. Some types of non-sequenced frames can convey data, which are also buffered in DSA during transfer as for normal data transfer frames.

8. INTERACTION BETWEEN PROCESSOR AND STATION

8.1 General Statements

This section describes some details of the interaction between processor and station in the present processor intercommunication system, i.e. it deals with the data and commands flowing across the Channel I/O Interface (FIG. 4) between a processor and the associated station's Channel Interface Controller.

The architecture of the system allows any of the processors to issue through this logical interface, via its own local station, read or write commands against each station on the link attached to a different processor. All data link control functions associated with data transfers exist beyond this interface, i.e. they are provided by the station, independent of the attached processor.

Thus each processor in the system may directly address other processors on the network in the same manner as it addresses other I/O devices which also reside on its Channel I/O Interface and of which it can request the sending and the receiving of data. Physically, a subchannel corresponding to the remote processor, but located within the local attached station is addressed. A subchannel is that part of the station that exercises and contains a Device Control Block and other control words that are intimately associated with an address on the processor I/O interface.

Elements that are dealt with in the following parts of this section are the Device Control Block DCB, the I/O Command Block IOCB, channel commands, condition codes reported over the interface for I/O commands and for interrupts, the Interrupt Information Byte IIB, the Residual Status Block RSB, and the interface signal lines involved.

One type of processor that is suitable for interconnection by the presently described system which is a preferred embodiment of the invention, is the IBM Series/1 4955 Processor which is described in a manual available under Form No. GA 34-0021. Some details of this processor's I/O channel functions and interface requirements are presented in the "IBM Series/1 User's Attachment Manual", available under Form No. GA 34-0033.

8.2 Device Control Block DCB

The Device Control Block (DCB) is a 16 byte main storage structure utilized for the execution of a device operation initiated by a start command. In this case, the device operation is an operation directed to a station on the link. The DCB is fetched by the attached station, using address key zero, after successful execution of the start command and stored in the Control Storage Array CSA as indicated in Section 6.2 above. The format of the DCB is as follows (eight fields of 16 bits each):

Field 7: Data Address
Field 6: Word Count
Field 5: Chain Address
Field 4: Residual Status Field
Field 3: DCB-ID (1 byte reserved)
Field 2: Reserved
Field 1: Frames Control Field
Field 0: Control Word The DCB pointer, i.e. the address Field 0, is transferred to the local station subchannel area during the execution of the start command.
Data Address: Starting main storage address for the message to be transferred.
Word Count: Count of the total number of words in the message to be transferred.
Chain Address: Main storage address of the next DCB. The chain address is valid only when the chain bit is indicated in the control word of the DCB. (Data chaining is not supported.)
Residual Status Feild: Storage address used for storing the Residual Byte count.
Device Control Block-Identifies: Specifies the DCB identifier which is placed in the IIB (expalined below) upon presentation of a program controlled interrupt (only 8 bit).

Frame Control Field: Valid only for control of non-sequential message transfer to the station or the link. The first byte of this field should contain the destination address of the non-sequential frame, while the second byte contains the non-sequenced control byte to be transferred.

Control word: Delineates the data transfer operation. It includes following fields:

Chain CHN Chain Flag (1 bit): indicates a DCB Chaining Operation. After completing the current message transfer to the station specified in the start command, the attached station will not interrupt but instead will fetch the next DCB in the chain to initiate another message transfer to the same station on the link.

Program Controlled Interrupt PCI (1 bit): causes the station to present a PCI interrupt at the completion of each DCB fetch. The data transfer, if any is required, associated with the DCB may commence, even though the PCI interrupt may be pending for the attached station. If the PCI interrupt is still pending when the station executes the next interrupt causing condition, the PCI will be discarded in favour of the new interrupt condition. When this bit is set to 1, bits 0–7 of the DCB-ID field in the DCB contains a DCB identifier which will be placed in the IIB upon interrupt presentation.

Input Flag IF (1 bit): tells the station whether the transfer is to be out of storage or into storage. Output=0 and Input=1.

Cycle Steal Address Key KEY (3 bit): A key presented by the attached station for data transfer to or from stations on the link.

Message Transfer Command MTC (7 bit): specifying the type of start commands to be executed. The following five commands are defined: Read (sequenced)-Write (sequenced)-NS Read-NS Write-NO OP (for sequencing of initialization data).

8.3 I/O Command Block IOCB and Channel Commands

All I/O command blocks transferred on the Channel I/O Interface are 32 bits, formatted as follows:
Bits 0–7: COMMAND
Bits 8–15: STATION ADDRESS
Bits 16–32: DATA WORD or DCB POINTER The command field specifies the operation to be performed by the station addressed in bits 8 through 15. Depending on the type of commands issued, the next two bytes could either be a data word or a DCB pointer. The set of IOCB commands accepted by the station is listed below. The two digits in parenthesis after the command designation are the hexadecimal representation of the command code (bits 0–7).

Prepare (60)

The prepare command is a subchannel directed command which controls the subchannel interrupt parameters. The Data Word/DCB pointer, in this case, contains a data word having the following format:
Bits 0–10: all zeros
Bits 11–14: LEVEL
Bit 15: I where LEVEL is a four bit encoded field which assigns the subchannel interrupt priority level. "I" is a subchannel interrupt mask that enables a subchannel to present an interrupt request. A logical "1" allows for interrupt while a logical "0" prohibits an interrupt.

Station Reset (6F)

Station reset is directed to the subchannel control words, resident in the attached station. A station reset will clear the subchannel associated with an addressed station, but not the addressed station. Along with the subchannel held in the attached station, the pending interrupts associated with the addressed station will be cleared. The I bit and the prepared level however will not be changed.

Start (70)

All data transfer operations are initiated by the start command. The Data Word/DCB pointer field contains the pointer to the location of the DCB in storage. All terminations of operations initiated by the start command are indicated via interrupts. In order to successfully execute an interrupt, there must have been a prior execution of a prepare command. Until the interrupt has successfully been executed, or cleared, the addressed subchannel is considered as busy.

Start Cycle Steal Status (7F)

This command is issued for the purpose of reporting residual parameters pertaining to operations started by the start command that are terminated with either an error or exception indication. The data word/DCB pointer field points to the storage location of the DCB. However, no chaining is allowed on the DCB.

The residual parameter transferred into the processor storage is 32 bytes in length. Its content will be the entire subchannel content. (See Section 6.2 for the subchannel content.)

Status Write (40)

Status Write is an attached station directed command which transfers two bytes into the station state field, internal to the attached station, concerning a station on the link. The data word/DCB pointer field contains the two byte data word that is to be transferred into the station state field. No action on the link will be a result of the status write command. The Byte 0 bit 0 of the two bytes indicates whether data transfer may be initiated to a given station.

Start Cycle Steal Non-Sequenced Read (71)

This command is issued for the purpose of fetching the non-sequenced frame received under a normal start command.

Diagnostic Control (61 through 68)

This set of commands is used by diagnostic programs.

Read Device ID (20)

This command causes a device identification word (Device ID) to be read in.

Read Status (21)

This command causes a status word to be transferred to the processor for diagnostic purposes.

8.4 Station Status and Interrupt Reporting

Reporting station status to the processor is accomplished by two basic mechanisms, i.e.
(a) Condition Codes
(b) Interrupt Information Byte IIB and the associated status word.

Condition codes are reported to the processor on two occasions. The first occasion is acceptance of a command issued by the processor. The other occurs during any presentation of an interrupt.

Associated with the interrupt presentation, an interrupt information byte is presented for condition codes 2, 4, and 6 (see below). The purpose of the interrupt information byte is to provide more description of the nature of the interrupt.

I/O Command Condition Codes

There are a total of eight I/O condition codes of which only seven are used. These condition codes occuring at the command presentation time are:

CC0 Station Not Attached: Presented if the address of the subchannel is not within the configured domain.

CC1 Busy: Reported when the station is actively engaged in an execution of an operation. A busy presentation will subsequently be followed by an end interrupt.

CC2 Reset In Progress: The station has previously been given a reset and is still in the midst of executing that reset. No interrupt will occur upon completion of the reset.

CC3 Command Reject: Implies that the command issued by the processor is out of the range of the intercommunication system's command set. Command Reject may also imply that the command has an improper format.

CC4 Not Used.

CC5 Interface Data Check: Presented by the station when it detects a parity error associated with the command issued.

CC6 Controller Busy: Used to report the fact that the attached station is busy at the moment transferring data to another station, other than that addressed by the start command.

CC7 Satisfactory: Implies acceptance of the command.

Interrupt Condition Codes

The condition codes presented during acceptance of interrupt are:

CC0 Controller End: Signifies that the attached station is free to accept I/O controller busy indication.

CC1 Program Controlled Interrupt (PCI): Presented after the cycle steal fetch of a DCB which has a PCI indicator on. No error or exception conditions have occured.

CC2 Exception Interrupt: Presented when an error or exception condition is detected in the execution of an operation. The condition is described in the associated interrupt information byte IIB.

CC3 Device End: Indicates proper conclusion of an operation or a set of operations with no error, exception, or attention conditions encountered.

CC4 Attention: Reported by the station concerning an external event not anticipated. A limited set of external events are described in the associated IIB.

CC5 Attention and PCI: Reported by the station when an attention condition is presented in conjunction with PCI. The condition causing the attention condition is contained in the associated IIB.

CC6 Not used.

CC7 Attention and Device End: Analogous to CC5, but for Device End conditions.

Interrupt Information Byte IIB

The interrupt information byte IIB provides further description for an interrupt. For all interrupt condition codes, except CC's 2, 4, 5, and 7, the interrupt information byte has a content of all zero's.

For condition code 2, each bit of the IIB is to be interpreted as follows:

Bit 0: Station Error—Bit 1: Not used.—Bit 2: Incorrect Length Record—Bit 3: DCB Specification Check.—Bit 4: Storage Data Check.—Bit 5: Invalid Storage Address.—Bit 6: Protect Check.—Bit 7: Interface Data Check.

All events above are errors resulting in CC2 report and termination of further operations. The IIB for condition code 4 reports events that may not be errors. These are events that require further examination by the programming system. For the most part, the set of events that have been identified are events due to a transfer from the station with no equivalent sub-channel set up by the programming system to handle the event.

Bits in the IIB for CC4, CC5 or CC7 are defined as follows:

Bit 0: Other status available in LM status byte, or Local Station Status byte in CSA, WD 4.—Bit 1: Frame retry occured, and retry was successful.—Bit 2: Station hardware error, any hardware error that cannot be attributed to a given subchannel.—Bit 3: Outbound frame internally detected error.—Bit 4: A frame has been received (except SIF with remote IPL) and the subchannel was not appropriately primed. Local station status byte contains further description (CSA, WD4).—Bit 5: Modem bypass armed.—Bit 6: Not used.—Bit 7: Not used.

8.5 Residual Status Block RSB

The residual status block is a location in processor storage pointed to by the residual status field located in the DCB. RSB contains the residual byte count for data transfers.

8.6 Input/Output I/O Interface Lines

For the present embodiment, at least the following signal lines are assumed to be present at the Channel I/O Interface between processor and station:

Bidirectional

Data Bus (18 bits, No. 00-15 plus 2P)
Address Bus (16 bits, No. 00-15)

From Processor to Station

Address Bus Extra Bit (No. 16)
Address Gate
Service Gate
Data Strobe
Cycle Input Indicator
Cycle Byte Indicator
IPL
Poll Identifier (5 bits)
Poll
System Reset
Power on Reset

From Station to Processor

Address Gate Return
Service Gate Return
Condition Code In Bus (3 bits)
Initiate IPL Request In Bus (16 bits)
Cycle Steal Request In
Poll Return
Burst Return A description of the signals transferred on these lines and of their meaning in specific situations is e.g. given in above referenced "IBM Series/1 User's Attachment Manual".

A brief description is given here for Data Bus, Address Bus, and Request In Bus.

The Data Bus transfers two bytes of data or control information plus two parity bits. On direct program controlled write sequences, data bus bits 00-15 are logically equal to the contents of IOCB bits 16-31 (second word). On direct program controlled read sequences, data bus bits 00-15 are driven by the station (subchannel) and correspond to bits 16-31 of the IOCB. On cycle steal service sequences, data bus bits 00-15 are equal to the contents of the word at the storage address presented by the station.

The Address Bus is used on direct program controlled sequences to pass commands to the station, with address bus bits 00-15 being logically equal to the contents of bits 00-15 of the IOCB (first word). The Address Bus is also used on cycle stealing sequences to present main storage addresses furnished by the station, to the channel controls. The Address Bus is not used on interrupt service sequences.

The Address Bus Extra Bit (Bit 16), when active, signals a direct program controlled sequence, i.e. the presence of an I/O command, to the station.

The 16-bit Request In Bus is used by the station to request an interrupt.

8.7 Operational Sequences on the Channel

Operations on the processor I/O channel are performed by the following major signal sequences.

Direct Program Control DPC sequence: A write or read transfer initiated by an operate I/O instruction. The sequence terminates after one byte or one word is transferred.

Interrupt service sequence: Initiated by a poll capture following an interrupt request from the station (or I/O device). The sequence is terminated after the interrupt ID word is transferred.

Cycle steal service sequence: An input or output transfer initiated by a poll capture after a cycle steal request from the station (or I/O device). The sequence terminates after one byte- or word-transfer unless burst mode is active.

Poll sequence: Initiated by either an interrupt request or a cycle steal request. The poll is either propagated or captured by the station (or I/O device). If the poll is captured, the station (or I/O device) returns a poll return tag for either (1) capture of an interrupt poll or (2) for a single cycle steal transfer. The station (I/O device) returns the burst return tag for multiple cycle steal transfers.

9. THE CHANNEL INTERFACE CONTROLLER CIC

9.1 Channel Interface Controller CIC Survey

The function of the CIC is to provide an interface between the station and the host processor, via the I/O channel, for up to 16 subchannels contained within the station.

The CIC consists of three separate, but logically connected areas. The three areas are Poll and Interrupt Control, I/O Sequencing and Address Decode, and Data Transfer and Cycle Steal Control.

The I/O Sequencing and Address Decode area provides interface synchronization for I/O operations and information transfer between the station and the host processor. This area decodes commands and addresses from the host processor and initiates the correct sequence of operations to the appropriate subchannel.

The Poll and Interrupt area provides the control and interface sequencing for the requesting of cycle steal and interrupt from the host processor, and the capture or bypass decoding of the host processor response.

The Data Transfer and Cycle Steal area provides the remaining functions of the CIC. These functions consist of logic for controlling physical storage space for 16 subchannel subsections in the Control Storage Array and 32 data buffers (two per subchannel) in the Data Storage Array along with the alternate usage control of the data buffers. It also provides the multiplexing, byte count, storage addressing, cycle steal and interrupt initiation, and CIC to Link Manager interface for the 16 subchannels contained within the station.

Some more details of each of these three areas are given in the following sections.

9.2 I/O Sequencing and Address Decode

This area synchronizes the I/O command and data transfer portion of the interface between the CIC and the processor to any of the possible 16 subchannel addresses within the station.

If it is determined that the I/O command address is the station address, then the command will be decoded to activate the correct response lines to the host processor. The information presented to the host processor will be dependent on command type and station condition. The station will always accept and act upon Device Reset and Prepare commands. All other commands will be responded with the status of the addressed resource or, if the station is busy, the response will be controller busy.

The I/O commands that are recognized by the station were listed in Section 8.3. Any other command will receive command reject.

The CIC constantly interrogates the processor Address Bus for activation of bit 16 which indicates the start of an I/O command. Bit 16 going active causes the CIC to decode the device address on the Address Bus to determine if the resource is within this station. If the addressed resource exists within the domain of this station the command portion of the address bus will be decoded and checked for validity. If the command is invalid (not recognized by the CIC) a command reject flag will be set for future use during prioritization of condition code response.

A Diagnostic Control command would set appropriate diagnostic mode latches within the CIC, force condition codes seven and proceed to termination without checking data bus parity.

If the command is a Start, Start Cycle Steal Status, Status Write, or Start Cycle Steal Non-Sequenced Read, then a nominal path is taken with the following actions. An immediate check is made to determine if the CIC is currently busy. This condition would force condition code six, controller busy, and proceed to termination. If the CIC is not busy the station state field will be fetched from word zero of the appropriate subchannel in the Control Storage Array CSA and decoded for future condition code response. At this time, the CIC is primed to examine the address gate interface line. When Address Gate rises, the CIC will parity check the Data Bus, then generate the Address Gate Return and supply the appropriate condition code to the processor. The CIC will now await the rise of Data Strobe at which time the Data Bus will be gated into the CIC. If the condition code response was 7 (subchannel ready and available), a request is made to the Data Transfer and Cycle Steal Control area.

If the command is a Start command the request will initiate a DCB fetch for the purpose of data transfer. If the command is a Start Cycle Steal Status, the request will initiate a partial DCB fetch obtaining only the information required to store the correct number of status bytes into the processor main storage. A Status Write command will initiate a request to store the contents of the data bus buffer into the addressed CSA subchannel (words 0 and 1) as a new Station State Field.

Had a Station Reset been decoded, a forced condition code of seven would be returned to the processor without interrogation of the Station State Field. A request then would be made to reset the addressed subchannel, clearing all pending interrupts.

If a Prepare command had been decoded, a check is made to see if the CIC currently has an active interrupt request. If a request is active, the I/O command address is checked with the active interrupt address. If the two addresses are equal an Address Equal flag is set for future decode. After the data bus is gated into the data bus buffer (if a prepare command had been decoded), the Address Equal latch now determines the action of the CIC. With the Address Equal latch set, a check is made to determine if the new interrupt level mask is enabled. If the mask is enabled, the new interrupt level is gated to an interrupt level buffer and Poll Request In Bus. Had the interrupt mask not been enabled the poll request is degated and the request bus is dropped. The new interrupt level/mask is then stored into the addressed subchannel and the CIC returns to either actively polling or to the Work Queue. Had the Address Equal Latch not been set, a check would be made to see if the new interrupt level mask were enabled. If the mask were enabled, a fetch of the Station State Field would be made from the addressed subchannel. A check is now made to see if an interrupt is pending. If an interrupt is pending, a request is made to the CIC Work Queue which will cause this interrupt to be presented. If the interrupt mask had not been enabled, no pending interrupt check is made as the interrupt capability of this subchannel is now disabled. The new interrupt level/mask is stored into the addressed subchannel and the CIC returns to the Work Queue for further job requests.

Although this area does not handle data transfers, it is responsible for the detection of Service Gate and the response of Service Gate Return, under control of the Data Transfer and Cycle Steal control area.

9.3 Poll and Interrupt Control

This area synchronizes and controls the poll portion of the interface between the processor and the CIC. The following functions are performed by this area:

Activate the Request In Bus with the appropriate interrupt level or cycle steal coding.
Maintain the level interrupt and/or cycle steal code being used for the currently active poll request.
Interrogate the Poll ID Bus from the processor and compare it with the active buffered level interrupt or cycle steal code for which the poll was requested.
Determine if the Poll ID matches the requested level interrupt or cycle steal and if the poll is to be captured or passed on.
Respond to the processor with either Burst Return or Poll Return. A Poll request operation for either cycle steal or level interrupt can be initiated by the CIC for only one of the ten conditions listed below:

1. A work queue request for remote IPL
2. A request for a DCB fetch due to command chaining
3. A work queue request for data transfer
4. A work queue request for an interrupt
5. A CIC detected error condition
6. A start command decode for a DCB fetch request
7. A start cycle steal command decode for a DCB request
8. A CIC Controller End condition
9. Special Diagnostic Controls
10. PCI Interrupt request There are two ways to initiate a poll request (Request In): Either by a cycle steal request, or by a level interrupt request. If the request is for a cycle steal, a code word 10011 is gated into the level code buffer, and bit 16 is raised on the Request In Bus indicating a cycle steal request to the processor. For a level interrupt request, the level code buffer is gated with the interrupt level. This interrupt level was obtained from the subchannel which initiated the interrupt request. The level code buffer is gated to the Request In Bus to indicate to the processor which level of interrupt is required.

The CIC then waits for the processor to activate the Poll ID Bus. When the bus is activated, a comparison is made between the level code buffer and the Poll ID Bus. At this time the decision is made as to whether the poll will be captured or propagated. When the Poll line becomes active the CIC will respond with either Burst Return or Poll Return, depending on a Burst Mode Latch having been set by either the burst bit in the DCB control word or the Burst Mode Option. Depending on the type of interrupt a request for the IIB and condition code or the PCI identifier will be made. Notification is now made to the initiating area that the poll has been captured. If the Poll ID Bus and level code buffer had been unequal, when the Poll line was activated the poll would have been propagated to the next device on the channel and the CIC would return to interrogating the Poll ID Bus.

9.4 Data Transfer and Cycle Steal Control

The primary function of this area is to control the transfer of data between the host processor and the station. Listed below are the mechanisms which are required to accomplish this function.

Initiate poll requests for interrupts and cycle steal.
Maintain a 256 word Control Storage Array CSA, for 16 subchannels of 16 words each.
Maintain 256 bytes of data buffering in Data Storage Array (DSA) on a basis of two separate 16 byte buffers for each of the 16 subchannels.
Maintain a 256×9 bit Work Queue WQ with pointer control. Control the data flow between the CIC and Processor for the 16 subchannels.
Control the alternate use of the two data buffers for each of the 16 subchannels, between the CIC and Link Manager OSR.

Control the decoding of RAS and interrupt status for presentation to the processor.

Execute job requests from the I/O Sequencing and Address Control Area.

Execute job requests from the Link Manager via the CIC Work Queue mechanism, and initiate the transfer of LM generated information from the CIC Work Queue to the Outbound Work Queue.

Decode commands from the processor and notify the LM to initiate a control read/write or a non-sequence frame via the Outbound Work Queue.

Maintain an operations sequence controller.

The CIC is in a constant state of interrogation for job requests. Job requests can come from the processor using the I/O mechanism or from the Link Manager via the CIC Work Queue. A job request due to the I/O instruction will normally result in the fetch of a DCB. The address for the DCB is obtaind from the data bus buffer, which was presented as part of the IOCB, and gated to the address control logic. A byte count of 16 bytes is generated for the DCB fetch and a DCB fetch latch is turned ON.

Along with checking DCB specifications, a check is made for a PCI interrupt request. If the PCI bit is set to one, a PCI interrupt request will be made for the corresponding subchannel. The PCI identifier, which is part of the DCB, will be fetched from the Control Storage Array for presentation to the processor, upon acceptance of the interrupt request. If the PCI request is not honored by the processor prior to another interrupt request by any of the other subchannels, the PCI request will be lost. Except for the above stated conditions a DCB fetch is primarily treated as an output data fetch.

Requests from the CIC Work Queue can be for data transfer, interrupt, retry and remote IPL (EIPL). If the work queue request is for a data transfer, the first action is to fetch the Station State Field and see if a cycle steal operation is allowed. This is necessary as multiple data transfer requests can exist in the circular Work Queue and a previous error may have caused the cancellation of any further data transfer operations for this subchannel. If the cycle steal is allowed, the CIC fetches the DCB control word, data address and data count, and places them in their respective operational work areas.

Next, the DCB control word is checked to determine if this operation is an input to the processor, or an output from the processor. If it is an output, the frame byte counter is forced to a value of 16 bytes. Partial frames on output operations must be 16 bytes in length and contain the frame byte count in byte one of the first word, therefore limiting the data bytes to a maximum of 14. A check is made to see if the burst bit is on in the DCB control word or if the Block Transfer option is active prior to making a request to the Poll and Interrupt Control area for a cycle steal.

If this is an input transfer, the first check is to determine if it is a partial frame request. If it is not a partial frame then the frame byte count is forced to a value of 16. If it is a partial frame, the partial frame count is transferred to the frame byte counter. A fetch is made from the Data Storage Array buffer to be transferred to the processor. At this time, in addition to checking for burst mode, the partial frame count is checked for a value of two or less which would cause the degating of burst mode if active. A request can now be made to the poll control and interrupt area for a cycle steal.

When a poll is captured, and when Service Gate rises a check is again made to determine if this is a DCB fetch, data transfer, interrupt or remote IPL request. For a data request the data is transferred across the processor interface. The CIC raises Service Gate Return, address key, an output/input indicator and a word/byte tag. The next sequence is to update the data address, data count and frame byte count. A check is now made to see if the data count or the frame byte count are equal to zero. The value of the data count and the frame byte count, along with the SE bit in the DCB control word will determine whether the CIC will continue data transfer for the frame in progress, terminate the subchannel with an incorrect length indication, terminate the subchannel with an incorrect length indication suppressed, terminate normally or return to the work queue for additional requests. By definition, the SE bit in this embodiment has a singular meaning, that is to control Suppress Incorrect Length indication.

Interrupt requests are first checked to see if the request was made by the CIC or the Link Manager. A CIC interrupt request causes a fetch of the Interrupt Level and Mask word from the Control Storage Array, followed by a fetch for the IIB and condition code word if the mask bit were set to allow interrupts. The IIB would now be encoded and the interrupt presented. If the mask bit were off then the CIS field would be set to 11 in the Station State Field which would notify the Work Queue and future Prepare commands that this subchannel had a pending stacked interrupt.

A Link Manager interrupt request causes a fetch of the Interrupt Level and Mask word from the Control Storage Array, followed by a fetch for the Link Station Status if the mask bit were set on. A decode of the Link Station Status would determine if a fetch for the IIB was needed for correct encoding of the status. The interrupt would now be encoded and presented to the processor. If the mask bit were off, stacking of a Link Manager interrupt request would occur in the same manner as described above the for CIC interrupt. If the Link Manager interrupt request had been due to a non-sequenced frame being received, then either an Exception or Attention interrupt would be presented, depending on whether or not a data option had been active. This would allow the processor to reply with a Start Cycle Steal Non-Sequenced Read command to obtain the information field from the Data Storage Array and/or a Start Cycle Steal Status command to obtain the control byte and origin address information from the Control Storage Array.

If a remote IPL request had been decoded the CIC would force an address of all zeros to the address control and degate the byte count circuitry. A cycle steal operation would be initiated and data transferred to the processor until a terminate request was received from the Link Manager at which time the remote IPL operation would be complete.

A decode of a Link Manager retry request for data would cause the CIC to fetch the Link Transfer Count and Data Retry Address from the Control Storage Array. These two fields, maintained by the Link Manager on a frame basis, would be substituted for the normal data address and count and a normal data transfer would take place.

If the retry operation is successful, the retry bit is set on by the Link Manager for use at ending sequence time. The retry bit (bit 2 of the SSF) would be used to create condition code 7 attention with device end instead of just device end (CC3) indicating the data transfer was successful but one or more frame retries were necessary.

An invalid request decoded from the CIC Work Queue would cause the termination of the subchannel operations. The CIC would post an interrupt request to notify the processor of the invalid request.

A parity error on the WQ bus, detected during the fetch of a Work Queue request will set a "Station Hardware Error" latch. All incoming frames on the link will be completely rejected with no response or any action taken. The interrupt to the host processor will be an exception interrupt (condition code 2) with bit 0 of the IIB presented to the host processor. In addition, bit 2 of the IIB will be set and stored in the subchannel for this station within the Control Storage Array (at word 6 byte 0) for interrogation by the host processor.

10. SESSIONS BETWEEN PAIRS OF STATIONS

10.1 Principles of Sessions

One principle of the present system is that for information transfer between stations, a frame which is initiated by a given station to be transferred to another station, and which is called a demand frame, must always be acknowledged by the other station upon receiving that frame. The acknowledgement may be made either by a response frame or by another demand frame. All demand frames are sequenced frames.

It should be noted that for direct transfer of information between processors, non-sequenced frames are used which are not demand frames and require a response only when this is indicated in the frame.

For a data exchange between stations, the system provides a specific protocol by which a "session" is established between pairs of stations. A session is equivalent to a one-way data path between the two stations involved. This could be termed a half-session, but the term session will be used within this specification. For a full-duplex data exchange, two parallel sessions each for one of the two directions can be established and maintained simultaneously in the system.

Each session involves three frame sequences in the respective stations as shown in FIG. 7. Data transfer frames (control, data, status) are mainly used for these sequences but regulatory frames (response, reject) can also be involved.

The first is an initiation or control sequence which is started by a control frame and establishes the respective session by a mutual agreement between the two stations. The second is the data transfer sequence proper during which the data are transferred in one direction. The third is a status exchange or termination sequence during which each of the two stations notifies the other of its status by sending a status frame, so that the session can be terminated properly. The step from the termination sequence to control sequence for the next session, as shown in FIG. 7, is made when another chained DCB is indicated in the DCB for the terminated sequence. Thus, a station will pass several times through the three session sequences if several DCBs were chained. When a single or the last of several DCB's was used, the exit will be taken after status exchange.

The three sequences and the station states involved will be explained in somewhat more detail in some of the following sections.

10.2 Types of Station Relationships

To simplify understanding of the description of sessions and of the frame exchange sequences involved, the different possible relationships between pairs of stations or subchannels are briefly reviewed in this section.

(a) Master-Slave Relationship

In a session, the station taking the initiative for establishing that session, i.e. the one which sends the first control frame, is called the master. The station which does not have the initiative but accepts the request from the master for establishing a mutual session is called the slave. A station can, however, be simultaneously a master in one session, and a slave in another session.

(b) Source-Sink Relationship

A session involves a data exchange between two stations in one direction. The station furnishing the data is called the data source, and the station accepting the data is called the data sink. When the master station is the source, there is a write transaction. When the master station is the sink, there is a read transaction.

For both, write and read transactions, however, the source must be in write state, and the sink must be in read state.

Thus, in a session in which station A requested data from station B, A is the master, is a data sink, and is in read status, whereas B is the slave, is a data source and is in write status, while the whole transaction is a read transaction.

Sending-Receiving Relationship

For each exchanged frame, one station is called the sending station and the other is called the receiving station. This relationship is of course only valid for a single frame, and it changes many times during each session.

10.3 Multiple Sessions

As will be evident from the foregoing description of the preferred system embodying the invention, there may be several sessions existing simultaneously, and as a consequence there may be several masters among the equal-ranking or peer-type stations of the system. One station may even be at the same time a multiple master, or may be simultaneously a master and a slave.

The invention enables the system to sustain these simultaneous relationships, without a permanent master or control station being provided, due to the multiple subchannels in each station supported by specific hardware in each station.

Figure 8:
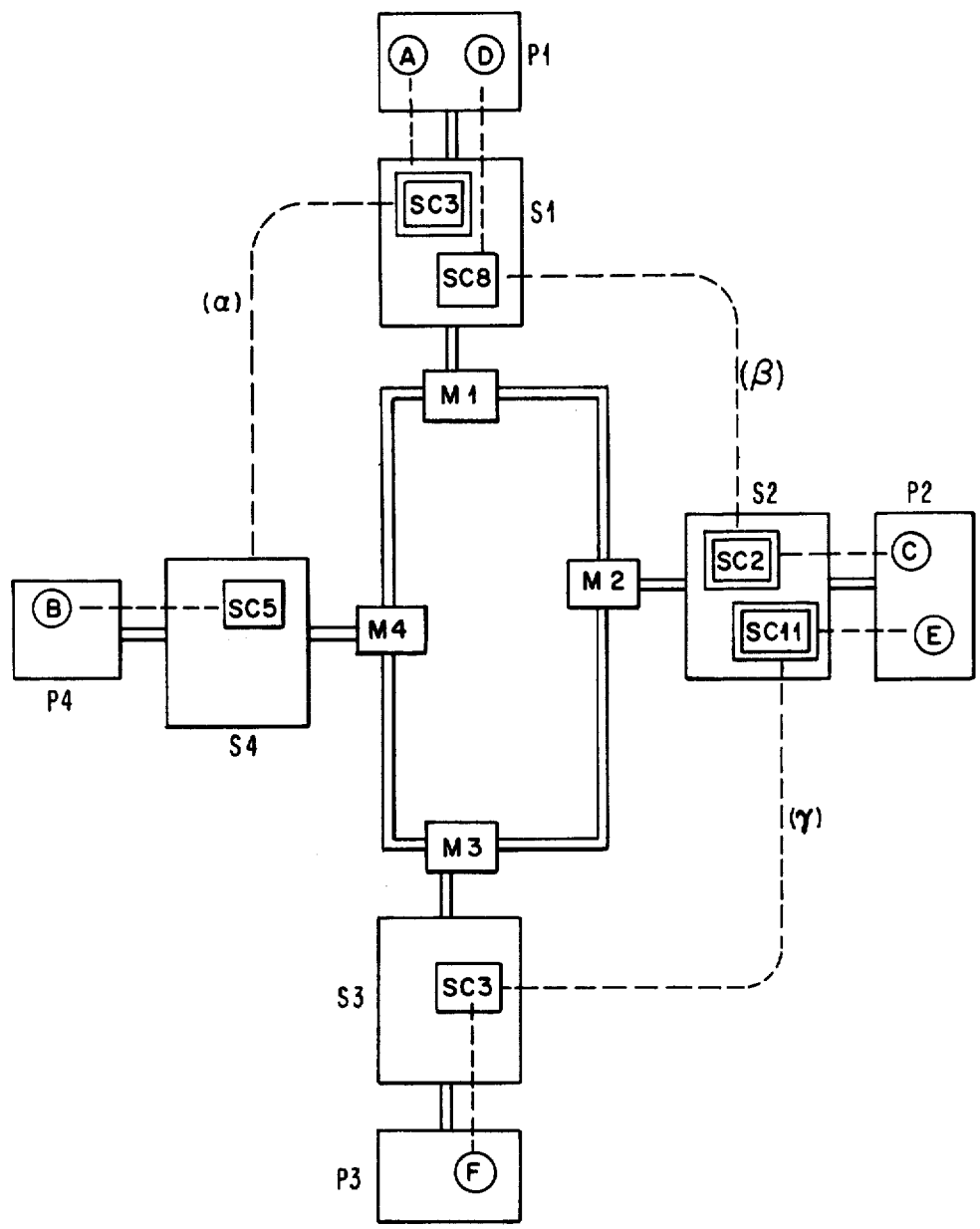
FIG. 8 Schematic illustration of multiple simultaneous sessions involving several stations and processors.

FIG. 8 illustrates the situation where three sessions exist in a simplified system including only four stations. The four stations (S1, S2, S3, S4) each include a modem (M1, M2, M3, M4), and each has a processor (P1, P2, P3, P4) attached to it. Selected subchannels (of the 16 subchannels provided by the present embodiment) are shown in the stations and are designated as SC3, SC8, etc. Programs or data sets in the processors, which communicate with each other through the intercommunication system of this invention, are each shown as a circle with an identification letter A, B, C, etc. The three simultaneous sessions between stations, or more exactly between subchannels in the stations, are designated by greek letters Alpha $\alpha$, Beta $\beta$, and Gamma $\gamma$.

The following situation is now assumed: Program A in processor P1 wants to read data from a data set B in processor P4, program C in processor P2 wants to have some task executed by program D in processor P1 and therefore must transfer parameters and operands to D, and processor P2 wants to send a complete program E as basic program F to processor P3.

Now A sends an I/O command to SC3 in S1 for the read process. SC3 establishes a session with SC5 in S4. SC5 will interrupt and notify processor P4 as required. Both subchannels will obtain the necessary DCB data from their processors, but establishment of session α will be made between the subchannels independent of processors P1 and P4. SC3 in station S1 is the master in session α. This fact is indicated by the double frame of box SC3.

In a similar way, session β for a write process (from P2 to P1) and session γ also for a write process (from P2 to P3) are established.

As a consequence, station S1 will be a master for session α (through SC3) and will be a slave for session β (through SC8), whereas station S2 is a duplicate master, for session β (through SC2) as well as for session γ (through SC11).

The mere transport function and the frame synchronization, transmission error checking, and disposition of frames, are handled by the modems M1 . . . M4. The data link procedures are handled by the remaining components of each station, i.e. by the Link Manager LM, Storage Section CSA and DSA, and Channel Interface Controller CIC, which together constitute the subchannels. Thus, the link protocol is implemented in the stations, and is independent of the processors. This enables effective communication between processors that are not very large and complex, and it also allows to change the communication medium or link without effecting most components of the system (except for the modems).

It should be noted that, if enough subchannels are available, multiple parallel sessions are possible between two stations, i.e. two programs (or logical units) in one processor can communicate simultaneously and independently with two programs (logical units) in one other processor, if two subchannels can be provided in each of the stations (i.e. a total of four subchannels will be involved). On this basis, a full duplex data exchange is possible between two stations if two parallel sessions were established for the two transmission directions.

Each application program in a processor is completely free of communication requirements and restrictions and need not be aware whether the process it communicates with is in a locally attached I/O device or in a remote processor attached to another station. The intercommunication system accepts commands and presents data as if it were another locally attached I/O device.

The communication system is not restricted to a specific application, such as updating of data sets, but is rather suited for all kinds of applications, as e.g. exchange of parameters or of intermediate results between cooperating programs in processors located remote from each other, and is also suited for remote initial program loading.

10.4 Session Sequences

This section describes the protocol to initiate a message transfer, transferring of the message, and the terminating of the message transfer. The protocol assumes that a mutual agreement exists between processors expecting the exchange. Hence the proper device control blocks will be loaded into the respective stations prior to the exchange via the station/processor interface. All sequence operations will go through initiation, data, and termination states on interface. Non-sequence operations, however, will bypass these machine states.

Figure 9:
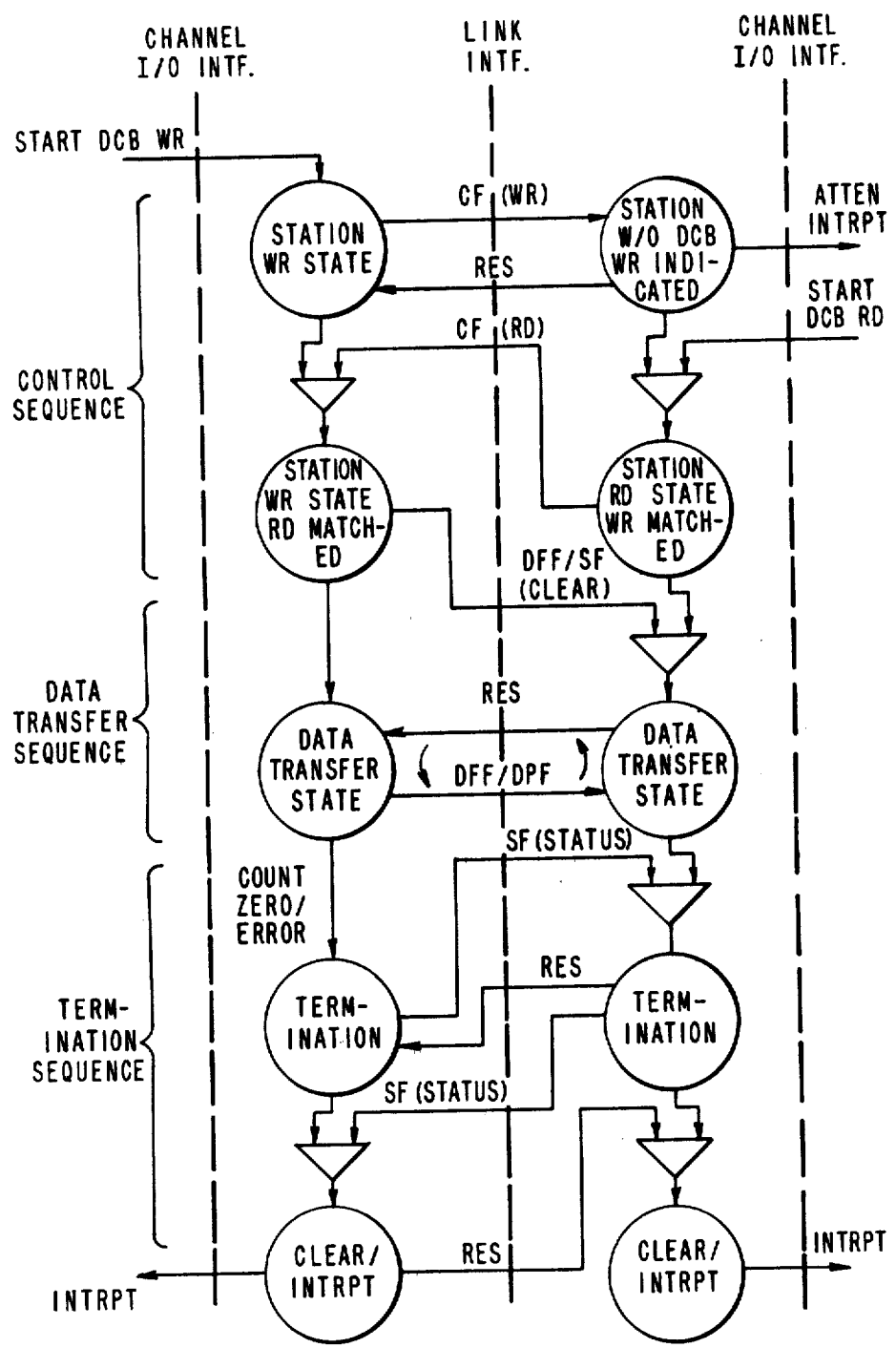
FIG. 9 and FIG. 10 Sequence diagrams respectively illustrating the different frame exchanges during a Write session and a Read session.
Figure 10:
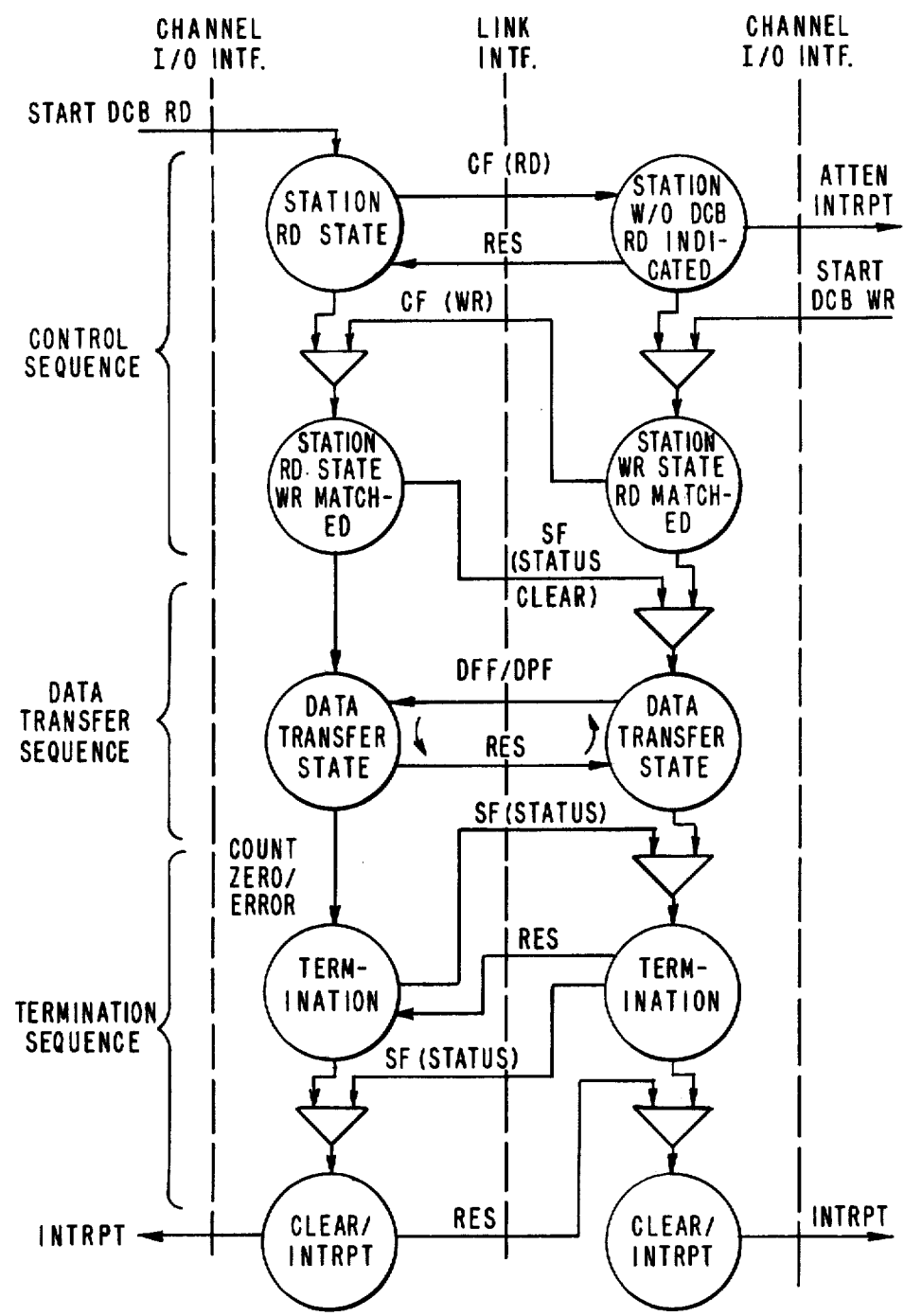

FIGS. 9 and 10 illustrate how transfers at the Channel I/O Interface stimulate the station machine states and the subsequent transfer pairs that must take place at the link interface. The dotted lines are the interfaces, while the circles represent the sending and receiving machine states of the stations, or the respective subchannels involved in the message transfer. The horizontal lines across the link interface dotted line are the frames that are sent or received to satisfy the machine state. The horizontal lines across the Channel I/O Interfaces are the commands or interrupts that traverse the I/O interface.

Message Transfer Initiation

A station having been properly primed by the processor attached may initiate message transfer with another station by first sending a control frame with "read" or "write" indicated in the information field. For a write operation to begin, the receive station for the control frame (i.e. the intended slave station) must be previously primed with a read. If the station was not previously primed, on receiving of the "Write" command, the station will send a response frame acknowledging the command. Aside from formulating the RES frame this intended slave station will also interrupt with an attention signal to its attached processing system notifying the "write" event. If the intended slave station receiving the "write" control frame has been previously primed with a "read", a status frame will be transferred in place of the RES, which will call for a proceed to the data or message transfer.

A control frame having a "read" indication, upon being received may also encounter two possible situations. If the receiving station for the control frame (i.e. the intended slave station) has previously been primed with read, a response of REJ will be provided. The REJ should cause the station which had sent the "read" control frame to post the "read" control block with an indication that it was rejected, and the processor issuing the "read" should then examine for possible program errors. If the station receiving the "read" control frame had not been previously primed at all, it should respond with an RES frame and post an attention to its attached host processing system. The attention interrupt will provide status indicating the condition of the intended slave station. The station which had sent the "read" control frame on receiving the RES frame, will then be the master station for the message transfer, and will hold up the "read" control block, waiting for a subsequent "Write" indication from the other station which has become slave station for the respective message transfer.

The possible sequences of frames transferred between these two stations are as follows:

| (a) | Master Station (Sink) | → CF (RD) →<br>← RES ←<br>← CF (WR) ←<br>→ SF (Clear) →<br>← RES or DFF or DPF ← | Slave Station (Source) |
|---|---|---|---|
| (b) | Master Station | → CF (WR) → | Slave Station |

| (Source) | ← RES ← | (Sink) |
| | ← CF (RD) ← | |
| | → SF (Clear) or DFF or DPF → | |

Note that in case (a), the response frame is used as filler in situations where immediate response with proper frame format cannot be met.

Data Or Message Transfer

Having been successfully initiated, the two stations can proceed immediately with the data or message transfer. As implied previously, the transfer is a demand-response discipline. Hence a set of data frames transferred must be responded with RES (on half duplex transmission) before proceeding with another set of data frames. Due to the structure of the sequence count up to 3 frames may be outstanding at any point in time prior to the receipt of the RES frame acknowledging the acceptance of the frames in the order sent. Because of the sequence count structure, data frames may be transmitted while the RES frame is being received. The data frame transfer sequence in the half duplex format could be one of the following, appearing on the link between the two stations involved in the transfer.

| (a) | Source Station | →DFF (1,2) → | Sink Station |
| | | ← RES (1,2) ← | |
| | | → DFF (2,2) → | |
| | | ← RES (1,3) ← | |
| (b) | Source Station | → DFF (1,2) → | Sink Station |
| | | → DFF (2,2) → | |
| | | → DFF (3,2) → | |
| | | ← RES (1,2) ← | |
| | | ← RES (1,3) ← | |
| | | → DFF (0,2) → | |

Note the DPF frames may be substituted for DFF frames. DPF frames are transmitted only on DCB boundaries having less than 16 bytes. The numbers in parenthesis following the DFF and RES frame types, represent the send and receive sequence counts respectively.

Termination

Termination of a message transfer could be initiated by either station involved in the exchange. The data source station terminates by sending a status frame, the data sink station must subsequently respond with a status frame. Likewise, the data sink station may terminate by first sending the status frame. This status frame will also have to be responded to with a status frame. Thus, the termination sequence need not be initiated by the master station which initiated the whole message transfer.

| (a) | Source Station | → SF → | Sink Station |
| | | ← RES ← | |
| | | ← SF ← | |
| | | → RES → | |
| (b) | Source Station | ← SF ← | Sink Station |
| | | → RES → | |
| | | → SF → | |
| | | ← RES ← | |

10.5 Exchange Sequence Examples

This section summarizes the executed operations for some examples of data exchange or message transfer sequences.

Write Data to a Station (FIG. 9)

The programming system or user application program first specifies a DCB or a set of DCB's properly chained. The DCB's should contain a properly defined DCB Control Word.

With the DCB's properly defined, a start command may be executed. The attached station on recognizing the start command and that the corresponding subchannel for the addressed station is not busy will return a satisfactory condition code. From this point forward, the station operation proceeds asynchronously with the processor instruction stream.

The attached station then cycle steals the DCB and loads the subchannel. Once the subchannel is loaded, the attached station will attempt to contact the addressed station and establish a data exchange via a control frame over the link interface. If the addressed station has previously been provided with a read DCB, the control frame will be accepted. The two stations in unison should proceed into data transfer sequence on the return of a status frame which contains a "00" byte which indicates proceed. If the addressed station has not been primed with a read, it will respond with a Regulatory response frame while attempting to interrupt its host processing system with an attention "write" event contained in the IIB.

After entering the data sequence, the attached station (master) will cycle steal data from the processor storage for data frames to be transferred to the addressed station (slave) following the prescribed data transfer protocols. Data transfer terminates when either the count specified within the DCB is reached or a status frame is received from the addressed station requesting termination.

The termination is followed by the posting of an interrupt to the host system. If error is indicated and Suppress Exception Se is off, then the contents of the subchannel will be preserved and may be later transferred, in cycle steal status mode, into storage by the execution of a start cycle steal status command.

Should the addressed station (slave) return a non-sequenced control message any time during either a write or a read operation, the operation will be terminated. An attention and exception condition will be indicated or conclition code CC6 is posted. The non-sequenced control message received will be stored in the data array for subsequent sensing by the attached processor.

Read Data from a Station (FIG. 10)

The execution sequence occuring in a read operation is essentially identical to the write operation sequences listed above except that all writes become reads, and vice versa.

Write Non-Sequenced Message to a Station

The DCB set up by the application or system's program should properly specify a DCB control word, a frame control field and a byte count of 16. Although the DCB's may be chained, if the processor expects a response for each control message, a chain should not be specified.

Execute start command.

The attached station on executing the start command fetches the DCB and sends out a single non-sequenced frame as specified in the DCB.

If no chain is indicated, the operation terminates with the attached station posting interrupt.

If an error that occurred on a non-sequenced frame is received prior to properly executing the interrupt, the residual status field will be properly filled with the residual byte count.

Read Non-Sequenced Message from a Station

The attached station can be primed to receive a non-sequenced control message by issuing a DCB specifying an NS Read. The message received is transferred to the location specified by the data pointer. Each DCB will handle a non-sequenced message frame of 16 data bytes. On receiving the message for the last DCB of a chain, the station interrupts signifying termination.

We claim:

1. A processor intercommunication system for effecting information transfer among a plurality of processors, said system having a communications link with a plurality of station nodes, said processors each having at least one Input/Output I/O channel and said processors each periodically requiring exchanges of information such as control, data and status information with other processors in said system, such exchanges occurring by way of individual logical connections and transfer sessions between processors, the arrangement establishing and maintaining a multiplicity of such logical connections or transfer sessions between individual stations and other stations, said system comprising:

a corresponding plurality of stations in said system, each of said stations being connected to a respective one of said station nodes for communication with any other station in said system by way of said communications link, each of said stations being attached to a respective one of said processors for controlling transfer of information such as said control, data, and status information between said processors over said communications link, such information being arranged in accordance with a variety of information frames, and each of said stations incorporating a modem for handling link related functions, such as information coding and modulation and the like, a link manager, said link manager providing logical frame management functions such as frame structuring, and the like, a channel interface controller, said channel interface controller providing interfacing for its station with its respective processor I/O channel, and the like, a storage section, said storage section incorporating a control storage array including a respectively assigned storage subsection for each station in the system for storing control information for the respective stations during transfer sessions, said storage section further incorporating a data storage array, including a respectively assigned storage subsection for each station in the system for storing data for the respective stations during transfer sessions, said storage section further incorporating a work queue storage array for storing work queues of pending task information during transfer sessions, and said arrays being commonly used by said link manager and said channel interface controller; and logic means in said channel interface controller and said link manager at each station operable in an initiating mode in response to control signals from the respective processor for initiating a logical connection with another station via said communications link by way of a requesting control frame to establish a transfer session, any station taking the initiative to establish a particular transfer session, i.e., the station which first sends a control frame being designated the master station and said logic means at each station being further operable in a receiving mode responsive to a received requesting control frame addressed to it and a conditioning signal from its respective processor to complete the logical connection, the station which does not have the initiative for a particular session but which accepts the requesting control frame from the master station for that particular session being designated a slave station, said logic means at each station being further operable to establish logical connections from the respective station to other stations via said communications link wherein any of said respective stations can simultaneously serve as a master in one transfer session and a slave in another transfer session through utilization of said control storage array, said data storage array and said work queue in a multiplexed manner under joint control of said link manager and said channel interface controller to thereby establish and maintain the required logical connections during operation of said system, whereby a multiplicity of interconnected master and slave station connections may exist within said system for accomplishing a multiplicity of exchanges of information in said system.

2. A processor intercommunication system in accordance with claim 1 wherein said logic means at each station is operable to establish and maintain multiple separate data transfer sessions between the respective station and other stations in said system in an independent manner with respect to but in cooperation with the processor to which it is attached and wherein said link manager at each station is operable to transmit data to and receive data from said communications link in cooperation with the related said logic means whereby independency of physical and topological characteristics of said logic means, said channel interface controller, and said link manager is provided for the logic means at each of said stations.

3. A processor intercommunication system in accordance with claim 1 wherein said work queue storage array stores pending task information entries concerning transfer sessions and is subdivided into a channel interface controller section and a link manager section, both being continuously scanned by said channel interface controller and link manager respectively, for sequentially extracting pending task information entires, said system further comprising:

interconnections provided in said logic means to enable communications between said channel interface controller and said link manager via said work queue storage array by cooperative entry and extraction of pending task information.

4. A processor intercommunication system in accordance with claim 1 wherein said logic means in said stations further comprises initiation means operable to exchange frames of control information between any two stations involved in a potential transfer session for entering compatible control information in an assigned control subsection storage area of each of the two stations involved;

transmit means operable upon establishment of a logical connection to transmit frames of data from the assigned data storage subsection in one station to the assigned data storage subsection in the other station;

termination means operable upon completion of the data transfer to exchange frames of status information between the two stations for a mutual updating of the control information in the respectively assigned control storage array subsections.

5. A processor intercommunication system in accordance with claim 4 wherein said logic means in said stations further comprises:

response means in any station addressed for a potential transfer session operable to check its present status when one station takes the initiative as a master to start the exchange of control information frames and to accept the intended data transfer session as a slave, or reject it, depending on such present status.

6. A processor intercommunication system in accordance with claim 4 wherein said logic means in said stations further comprises:

control logic operable to transfer a block of control information in both stations involved from the individual processors to which the stations are respectively attached to the selected control information storage subsection in the respective station and to update such block of control information by control and status information exchanged in respective frames between said stations.

7. A processor intercommunication system in accordance with claim 1 wherein a transfer session involves an exchange of information between two stations in said system in one direction via said communications link, wherein exchanges of information in said system in any transfer session involve a Write operation by a first processor to record information received by a station via said communications link and a Read operation by the other processor to read information for transmission by a station via said communications link, the station/processor transmitting information being designated a data source, and the station/processor accepting the data being designated a data sink, the arrangement being such that when the master station is the data source, there is a Write transaction and when the master station is the sink, there is a Read transaction, but for both Write and Read transactions, the source is in a write state and the sink in a read state.

* * * * *